(12) United States Patent
Nakamura

(10) Patent No.: US 11,314,238 B2
(45) Date of Patent: Apr. 26, 2022

(54) PLANT OPERATIONAL PLAN OPTIMIZATION DISCRETE EVENT SIMULATOR DEVICE AND METHOD

(71) Applicant: LEXER RESEARCH Inc., Tottori (JP)

(72) Inventor: Masahiro Nakamura, Tottori (JP)

(73) Assignee: LEXER RESEARCH INC., Tottori (JP)

( * ) Notice: Subject to any disclaimer, the term of this patent is extended or adjusted under 35 U.S.C. 154(b) by 405 days.

(21) Appl. No.: 16/487,208

(22) PCT Filed: May 1, 2017

(86) PCT No.: PCT/JP2017/017209
§ 371 (c)(1),
(2) Date: Aug. 20, 2019

(87) PCT Pub. No.: WO2018/154799
PCT Pub. Date: Aug. 30, 2018

(65) Prior Publication Data
US 2019/0377334 A1    Dec. 12, 2019

(30) Foreign Application Priority Data
Feb. 24, 2017 (JP) .............................. JP2017-033333

(51) Int. Cl.
*G05B 19/418* (2006.01)
*G06Q 10/06* (2012.01)
*G06Q 50/04* (2012.01)

(52) U.S. Cl.
CPC . *G05B 19/41885* (2013.01); *G05B 19/41865* (2013.01); *G06Q 10/06* (2013.01);
(Continued)

(58) Field of Classification Search
CPC ........ G05B 19/41885; G05B 19/41865; G06Q 10/04; G06Q 10/06; G06Q 50/04; Y02P 90/02; Y02P 90/30
See application file for complete search history.

(56) References Cited

U.S. PATENT DOCUMENTS 5,229,948 A * 7/1993 Wei .................. G05B 19/41885
703/2
6,405,157 B1    6/2002 Fujii et al.
(Continued)

FOREIGN PATENT DOCUMENTS

CN    101833709 A    9/2010
CN    205028425 U    2/2016
(Continued)

OTHER PUBLICATIONS

Persson, F. & Araldi, M. "The Development of a Dynamic Supply Chain Analysis Tool—Integration of SCOR and Discrete Event Simulation" Int'l J. Production Economics, vol. 121, pp. 574-583 (2009) (Year: 2009).*
(Continued)

*Primary Examiner* — Jay Hann
(74) *Attorney, Agent, or Firm* — Westerman, Hattori, Daniels & Adrian, LLP

(57) ABSTRACT

The integrated control processing unit is configured to recognize a varying processable amount over time within a predetermined period of each of the simulators; transmit a simulation request for a simulation process within an optimal processing amount within the recognized processable amount of each of the simulators to each of the simulators together with an operation state information group and a simulation condition; receive a plurality of evaluation value groups as a simulation process result based on the operation state information group and the simulation condition from each of the simulators; and recognize a highest evaluation (Continued)

value group based on an operation objective function among a plurality of received evaluation value groups. The operational plan optimization device can perform various simulation operations at high speed at lower cost and recognize an optimal operation efficiently using hardware resources when performing operation simulation.

12 Claims, 16 Drawing Sheets

(52) U.S. Cl.
CPC .............. *G06Q 50/04* (2013.01); *Y02P 90/02* (2015.11); *Y02P 90/30* (2015.11)

(56) References Cited

U.S. PATENT DOCUMENTS

| | | | |
|---|---|---|---|
| 7,499,766 B2* | 3/2009 | Knight | G06Q 10/087 700/107 |
| 7,627,493 B1 | 12/2009 | Sarthi et al. | |
| 10,242,132 B2 | 3/2019 | Nakamura | |
| 2004/0230404 A1* | 11/2004 | Messmer | G06Q 10/06 703/1 |
| 2006/0200333 A1* | 9/2006 | Dalal | G06F 30/20 703/17 |
| 2013/0162428 A1 | 6/2013 | Baines et al. | |
| 2015/0220069 A1 | 8/2015 | Linehan et al. | |

FOREIGN PATENT DOCUMENTS

| | | |
|---|---|---|
| JP | H10-240717 A | 9/1998 |
| JP | 2000-202742 A | 7/2000 |
| JP | 2002-006934 A | 1/2002 |
| JP | 2003-288476 A | 10/2003 |
| JP | 2004-070574 A | 3/2004 |
| JP | 2004-097532 A | 4/2004 |
| JP | 2005-070883 A | 3/2005 |
| JP | 2005-100092 A | 4/2005 |
| JP | 2012-8729 A | 1/2012 |
| JP | 5688864 B2 | 3/2015 |
| JP | 2015-126804 A | 7/2015 |
| JP | 2016-126440 A | 7/2016 |
| KR | 20120053481 A | 5/2012 |
| WO | 2013/145512 A1 | 10/2013 |

OTHER PUBLICATIONS

Sarimveis, H., et al. "Dynamic Modeling and Control of Supply Chain Systems: A Review" Computers & Operations Research, vol. 35, pp. 3530-3561 (2008) (Year: 2008).*

Terlunen, S. "Adaption of the Discrete Rate-Based Simulation Paradigm for Tactical Supply Chain Decisions" Proceedings of 2014 Winter Simulation Conf., pp. 2060-2071 (2014) (Year: 2014).*

Nakamura et al., "Dynamic Optimization Production System Based on Simulation Integrated Manufacturing and its Application to Mass Production", International Journal of Automation Technology, Fuji Technology Press Ltd, Jan. 5, 2017, vol. 11, No. 1, pp. 56-66, cited in Specification (11 pags).

International Search Report dated Jul. 4, 2017, issued in counterpart International Application No. PCT/JP2017/017209 (1 page).

* cited by examiner

Fig. 6

| | sc i1 | sc i2 | sc i3 | sc i4 | ... | sc im |
|---|---|---|---|---|---|---|
| SC1 | Production order 1: P6 | Route of production order 1: R11 | Production order 2: P7 | Route of production order 2: R11 | ... | ... |
| SC2 | Production order 1: P6 | Route of production order 1: R11 | Production order 2: P7 | Route of production order 2: R12 | ... | ... |
| SC3 | Production order 1: P6 | Route of production order 1: R11 | Production order 2: P7 | Route of production order 2: R13 | ... | ... |
| ... | ... | ... | ... | ... | ... | ... |
| SCi | Production order 1: P6 | Route of production order 1: R11 | Production order 2: P8 | Route of production order 2: R11 | ... | ... |
| ... | ... | ... | ... | ... | ... | ... |
| SCn | Production order 1: P6 | Route of production order 1: R11 | Production order 2: P9 | Route of production order 2: R14 | ... | ... |

PLANT OPERATIONAL PLAN OPTIMIZATION DISCRETE EVENT SIMULATOR DEVICE AND METHOD

TECHNICAL FIELD

The present invention relates to an operational plan optimization device and an operational plan optimization method for simulating operations for recognizing an optimal operation method or optimizing and planning the operation method in an operation made up of elements such as products, machines, operators, and transport means such as transport operators and forklifts related to logistics in, for example, the operation steps related to production in a manufacturing industry.

BACKGROUND ART

In recent years, in production plants, the degree of small-volume production in great varieties in which a large number of products are manufactured according to various market demands has increased, and cases in which a plurality of production items are produced in a single production line have increased. In a case where various products are manufactured on the same production line in a mixed manner, since the number of components, a processing method, an assembling method, the number of steps in the production line, and an operation time required in respective steps are different depending on a product, a problem that does not occur in a production system of a single product occurs.

For example, when various products are manufactured on the same production line, interference between production lots occurs and stagnation for waiting for the production order occurs. Specifically, when components of respective products produced in a previous step are put into an assembly line which is a post-process, the components have to wait due to interference with a production instruction for another product, which results in a temporary accumulation of stock of components between steps. Moreover, various kinds of waste occur. Specifically, when an operation time necessary in respective steps are different depending on a product, a variation in the operation time of the respective steps occurs, which produces a standby time in the respective steps. In order to manufacture different products, it is necessary to perform a so-called stage replacement such as change of jigs. Although it is necessary to timely supply necessary components to necessary steps according to the production plan of each product in the logistics in a plant, the supply of components becomes complex when various products are manufactured.

In order to cope with such a problem, conventionally, a scheduler has been used as a computer processing technology to optimize production planning. However, since a scheduler aims to optimize a complex flow of works and an irregular operation of operators on a production line, the costs for developing the logics for analyzing a target production line and optimizing the production plan incur. When the logics for detailed behaviors corresponding to an actual production line are to be developed, an enormous amount of time for analysis and development incurs. Moreover, the logics in a scheduler are a search method of giving various static conditions and narrowing down to a solution that satisfies these conditions. As a result, since it is not guaranteed that the generated optimal solution is a state optimal under all conditions, it is not possible to present a reasonable solution to users in a production field. Moreover, when production items or facilities on a production line are changed, for example, it is necessary to change the logics and there is a problem that users who do not have specialized knowledge on scheduling cannot cope with the change.

Due to this, a method of realizing optimization on the basis of effect analysis based on a simulation technology instead of a scheduler is expected. The simulator of a production line is generally performed by a technology called a discrete simulation. The discrete simulation involves setting facility elements such as products, machines, operators, and transport means such as forklifts, operations induced by the respective facility elements, and induction conditions, evaluating induction relations thereof, and predicting a behavior of a production line (see Patent Documents 1 and 2).

In discrete simulation of a production line, specific operations are induced on facility elements serving as the root of a production process network whereby induction of the specific operations propagates to facility elements of a production process network connected to the root, operation of the simulation proceeds, and a progress state of production in the production line is simulated. By recording the starting time and the ending time of the specific operations of the respective facility elements and the number of consumed components, it is possible to predict change over time in an operation time ratio of each facility element and change over time in the number of consumed components. Moreover, it is possible to predict the time (lead time) required for producing one product and the state related to component supply logistics such as whether a component prepared in a component warehouse is out of stock and the time point at which the component becomes out of stock and to analyze a problem in the production line before mass production starts. In this way, the selection of the order (production plan) of putting production lots and a production line, the selection of respective production stations in a production line, the selection of the flow (routing) of the production stations and the selection of specific molds and tools to be used for production, and an instruction of steps related to an operator having a unique name are determined.

Non-Patent Document 1 discloses a technology of performing optimization based on production simulation, in which a manager device of a processing mechanism that executes a parallel simulation operation outputs a production model in which individual conditions are applied to many production simulation engines distributed on a network, collects values as calculation results of an objective function after the simulation operation is performed, and evaluates the calculation results to thereby calculate an optimal restriction condition for the production model.

CITATION LIST

Patent Document

Patent Document 1: Japanese Patent Application Laid-Open No. JP2000-202742A
Patent Document 2: Japanese Patent No. 5688864

Non-Patent Document

Non-Patent Document 1: Masahiro Nakamura, Tadashi Makihara, Jun-ichi Sugiura, and Yosuke Kamioka, "Dynamic Optimization Production System Based on Simulation Integrated Manufacturing and its Application to Mass Production", International Journal of Automation Technology, FUJI Technology Press LTD, Jan. 5, 2017, Volume 11, Issue 1 (consecutive volume number 57)), pages 56-66

SUMMARY OF THE INVENTION

Problems to be Solved by the Invention

However, in the conventional discrete simulation, after a calculation process of a corresponding case is performed under a certain specific condition, it is determined whether the condition is appropriate or not. When cases are deployed according to combinations of conditions and an enormous number of cases are assumed as in small-volume production in great varieties, it is difficult to specify an optimal condition by evaluating individual conditions using discrete simulation only. In order to select an optimal condition, it is necessary to set conditions mechanically for various cases under combinations of production conditions, perform a calculation process for respective cases to execute simulation, and perform a large number of calculation processes. Therefore, generally, hardware resources having very high processing performance are required. However, such hardware resources are very expensive.

In this case, when the processing mechanism that executing parallel simulation operation disclosed in Non-Patent Document 1 is used, it is possible to perform various simulation operations at low cost and high speed without requiring expensive hardware resources. However, in order to efficiently utilize hardware resources of the parallel simulation operation to realize these effects, it is necessary to concretize the processes of the hardware resources of the parallel simulation operation.

The present invention is proposed in view of the above-described problems, and an object of the present invention is to provide an operational plan optimization device and an operational plan optimization method capable of efficiently utilizing hardware resources of a processing mechanism that executes a parallel simulation operation, executing various simulation operations at lower cost and at high speed, and recognizing an optimal operation even when an enormous number of cases are assumed.

Solutions to Problems

An operational plan optimization device according to the present invention includes: an integrated control processing unit; and a plurality of simulators communicably connected to and controlled integrally by the integrated control processing unit, wherein the integrated control processing unit is configured to: recognize a varying processable amount over time within a predetermined period of each of the simulators; transmit a simulation request for a simulation process within an optimal processing amount within the recognized processable amount of each of the simulators to each of the simulators together with an operation state information group and a simulation condition; receive a plurality of evaluation value groups as a simulation process result based on the operation state information group and the simulation condition from each of the simulators; and recognize a highest evaluation value group based on an operation objective function among a plurality of received evaluation value groups.

An integral processing program of the operational plan optimization device, an integral processing program product, an integral processing program medium, or a computer-readable recording medium having the integral processing program recorded, to the present invention, therein causes a server of the operational plan optimization device including the server and a plurality of simulators communicably connected to and controlled integrally by the server to function as means for recognizing a varying processable amount over time within a predetermined period of each of the simulators; transmitting a simulation request for a simulation process within an optimal processing amount within the recognized processable amount of each of the simulators to each of the simulators together with an operation state information group and a simulation condition; receiving a plurality of evaluation value groups as a simulation process result based on the operation state information group and the simulation condition from each of the simulators; and recognizing a highest evaluation value group based on an operation objective function among a plurality of received evaluation value groups.

According to this configuration, the integrated control processing unit can recognize the varying processable amount over time of each of the simulators to cause the respective simulators to perform a simulation process within the optimal processing amount in the processable amount, efficiently utilize hardware resources of a processing mechanism that executes a parallel simulation operation, execute various simulation operations at lower cost and at high speed even when an enormous number of cases are assumed as in small-volume production in great varieties. Moreover, the integrated control processing unit receives a plurality of evaluation value groups as the simulation process result based on the operation state information group and the simulation condition from the plurality of simulators and recognizes the highest evaluation value group based on the operation objective function among the plurality of evaluation value groups. In this way, it is possible to recognize an optimal operation which complies with an operation objective and an operation state.

In the operational plan optimization device of the present invention, the evaluation value group may include a degree of similarity to a present operation as an evaluation value.

According to this configuration, it is possible to recognize an optimal operation that is easily performed at the site and by an operator without changing an existing operation method remarkably. For example, when an evaluation value group is made up of indices related to production only, production corresponding to the highest evaluation value group may include production including a production method which is difficult to cope with and which has not been experienced in executing production actually, production which involves a drastic change in layout which may impose burden on a production site, or production of which the production policy is greatly different from a conventional production policy. However, when the degree of similarity to a present operation is included in the evaluation value of an evaluation value group, it is possible to recognize "optimal production which is easy to produce and is easy to perform and which is not changed greatly from an existing method" in a production site.

The operational plan optimization device of the present invention may further include an operation state information acquisition unit that acquires the operation state information, and the operation state information may be transmitted from the operation state information acquisition unit to the integrated control processing unit.

According to this configuration, the integrated control processing unit can automatically recognize the operation state information from the operation state information acquisition unit to cause the simulator group to perform a simulation process, recognize a highest evaluation value group which complies with an operation objective and an operation state, and recognize an optimal operation.

In the operational plan optimization device of the present invention, the integrated control processing unit may generate an individual operation instruction corresponding to the recognized highest evaluation value group and transmit the individual operation instruction to at least an operator terminal approximately on a real-time basis. The individual operation instruction is preferably transmitted to as many units as possible that can receive the instruction such as the operation state information acquisition unit capable of receiving the individual operation instruction in addition to the operator terminal.

According to this configuration, the highest evaluation value group and the optimal operation obtained from operation simulation can be immediately applied as an individual operation instruction, the individual operation instruction can be quickly delivered to an operator and the like, an optimal operation system can be established quickly, and an optimal operation can be executed speedily.

The operational plan optimization device according to the present invention may further include a refinement control component communicably connected to the integrated control processing unit, and the integrated control processing unit may generate a simulation condition on the basis of the operation state information group and a refinement condition of the refinement control component. The refinement control component may be configured as a computer having a communication interface, a hard disk, or both, and the refinement control component is preferably configured as a computer having a communication interface.

According to this configuration, since the integrated control processing unit generates the simulation condition on the basis of the refinement condition of the refinement control component and the operation state information, it is possible to sequentially generate necessary simulation conditions and use the same in a simulation process.

Therefore, it is possible to eliminate the need to prepare hardware that generates a list of patterns of an enormous number of simulation conditions corresponding to operation state information by a simulation operation. Therefore, it is possible to reduce the cost of hardware resources using hardware resources efficiently. Moreover, since the number of simulation conditions increases enormously when the number of combinations of conditions increases, it is possible to remove unnecessary simulation conditions to reduce the enormous number of simulation conditions to obtain a number of processable simulation conditions with the refinement condition to thereby execute operation for optimization and to reduce the cost of hardware resources. Moreover, it is possible to set a more appropriate refinement condition of the refinement control component in compliance with characteristics of market conditions, characteristics of production lines, manufacturing management policies such as setting the delivery priority corresponding to a customer request in a production plan and setting the priority of a production facility to be operated actively from the viewpoint of depreciation of facilities and quality management, for example. Therefore, the integrated control processing unit can generate a more appropriate simulation condition and use the same in a simulation process. Furthermore, since the refinement control component and the integrated control processing unit are communicably connected rather than being integrated, it is possible to use an appropriate refinement condition and an appropriate simulation condition flexibly as necessary and to improve the flexibility, the diversity, and the versatility of the simulation process.

In the operational plan optimization device of the present invention, a degree of refinement of the refinement condition of the refinement control component may be changeable, or the refinement conditions of a plurality of degrees of refinement may be set in the refinement control component.

According to this configuration, for example, when an administrator determines that the result of a first highest evaluation value group obtained on the basis of a first refinement condition needs to be simulated using a different condition, it is possible to obtain the result of a second highest evaluation value group using a second refinement condition of a weaker degree of refinement than the first refinement condition or to recognize an optimal evaluation value group and an optimal operation among the highest evaluation value groups obtained on the basis of the plurality of refinement conditions. In this way, it is possible to attain a highest evaluation value group and an optimal operation which are considered to be optimal from artificial determination or are considered to be optimal from a simulation process based on a plurality of refinement conditions without strengthening the degree of refinement too much and eliminating the evaluation value group from an evaluation target.

In the operational plan optimization device of the present invention, the refinement control component may generate the refinement condition on the basis of a setting condition and a plurality of refinement control components may be provided.

According to this configuration, for example, when the first refinement condition is generated on the basis of the first setting condition of the first refinement control component, the result of the first highest evaluation value group obtained on the basis of the first refinement condition is the result for the range that depends on the first setting condition. In contrast, when an administrator determined that it is necessary to perform simulation under a different condition, it is possible to set a specific individual condition among the simulation conditions corresponding to the first highest evaluation value group as the second setting condition of the second refinement control component and obtain the result of the second highest evaluation value group using the second refinement condition generated therefrom. Moreover, it is possible to execute processes according to the third and fourth refinement conditions continuously on the basis of the result. In this way, it is possible to attain a highest evaluation value group and an optimal operation which are considered to be optimal while continuously changing the refinement range without extending the range and strengthening the degree of refinement too much and eliminating the evaluation value group from an evaluation target. Since a plurality of refinement control components that generates a refinement condition and is communicably connected to the integrated control processing unit is provided, a first refinement control component may be provided in a place where a production plan is created, a second refinement control component may be provided in the site, the same or different persons may set the setting conditions to the first and second refinement control components, and the first and second refinement control components may be caused to generate refinement conditions and execute operation simulation, for example. In this way, it is possible to perform an operation simulation process flexibly according to the need in the process of creating an operational plan.

In the operational plan optimization device of the present invention, the integrated control processing unit may receive information on the start and completion of the simulation process directly or indirectly from another integrated control processing unit of another operational plan optimization device that shares the plurality of simulators, and the integrated control processing unit may stop recognizing the varying processable amount over time within the predetermined period of each of the simulators from the start to the completion of the simulation process.

According to this configuration, it is possible to perform a process of recognizing the processable amount over time of the simulator group with less labor and efficiently use hardware resources by the plurality of operational plan optimization devices sharing the simulator group.

An operational plan optimization method according to the present invention is an operational plan optimization method which uses the operational plan optimization device according to the present invention, in which the integrated control processing unit executes the steps of: executing a simulation process on a first operation range to recognize a highest evaluation value group of the first operation range; executing a simulation process on a second operation range to recognize a highest evaluation value group of the second operation range; and setting a third simulation condition including a first simulation condition corresponding to a highest evaluation value group of the first operation range and a second simulation condition corresponding to a highest evaluation value group of the second operation range, executing a simulation process on the third operation range including the first operation range and the second operation range using the third simulation condition, and recognizing a highest evaluation value group of the third operation range.

According to this configuration, when a calculation amount increases enormously and the number of combinations increases explosively if a simulation process of the entire operation is performed, it is possible to perform simulation in advance for a plurality of operation ranges divided from the entire operation to acquire a simulation condition for the entire operation from the result related to the partial optimization of the respective operation ranges, recognize the highest evaluation value group of the entire operation on the basis of the operation objective function according to the simulation condition, and recognize the highest evaluation value group and the optimal operation efficiently with a calculation amount which is practically executable with hardware resources. Moreover, since this method involves performing simulation based on the operation ranges divided from the entire operation, an operation which is easy to perform and which involves less change in an existing operation is likely to be recognized, and an optimal operation which is easily performed at the site and an operator. For example, combinations are calculated for a certain operation range of a production order on the basis of a present production plan to realize partial optimization and fitting, the combinations are processed sequentially for all operation ranges, and a simulation process is performed for the entire operation whereby the production plan can be changed to a production plan which is optimal on the extension line of the present plan.

An operational plan optimization method according to the present invention is an operational plan optimization method which uses the operational plan optimization device according to the present invention, in which the integrated control processing unit executes the steps of: transmitting a simulation request of a first simulation condition generated on the basis of a first refinement condition to each of the simulators together with an operation state information group and the first simulation condition; receiving a plurality of first evaluation value groups as a simulation process result based on the operation state information group and the first simulation condition from each of the simulators; recognizing a first highest evaluation value group based on a first operation objective function among the received plurality of first evaluation value groups and recognizing a distribution of the plurality of first evaluation value groups; storing a second operation objective function input on the basis of the plurality of first evaluation value groups; and recognizing a second highest evaluation value group based on a second operation objective function among the plurality of first evaluation value groups.

According to this configuration, it is possible to evaluate the plurality of first evaluation value groups of the simulation process result using the first operation objective function, recognize the first highest evaluation value group based on the first operation objective function, and recognize a second highest evaluation value group based on the second operation objective function among the plurality of first evaluation value groups using the second operation objective function set by referring to the distribution of the plurality of first evaluation value groups. Therefore, for example, when an administrator determines whether there is an appropriate solution or an optimal operation more than a solution or an optimal operation based on the first operation objective function, it is possible to set the second operation objective function by referring to the distribution of the plurality of first evaluation value groups, recognize a solution or an optimal operation based on the second operation objective function, and recognize a solution or an optimal operation based on each of a plurality of operation objective functions so that the administrator can compare and examine the solutions or the optimal operations. Therefore, it is possible to examine a plurality of evaluation value groups and a plurality of highest evaluation value groups in a comprehensive way and from various viewpoints.

An operational plan optimization method according to the present invention is an operational plan optimization method which uses the operational plan optimization device according to the present invention, in which the integrated control processing unit executes the steps of: transmitting a simulation request of a first simulation condition generated on the basis of a first refinement condition to each of the simulators together with an operation state information group and the first simulation condition; receiving a plurality of first evaluation value groups as a simulation process result based on the operation state information group and the first simulation condition from each of the simulators; recognizing a first highest evaluation value group based on a first operation objective function among the received plurality of first evaluation value groups and recognizing a distribution of the plurality of first evaluation value groups; storing a second operation objective function input on the basis of the distribution of the plurality of first evaluation value groups; transmitting a simulation request of a second simulation condition generated on the basis of a second refinement condition to each of the simulators together with the operation state information group and the second simulation condition; receiving a plurality of second evaluation value groups as a simulation process result based on the operation state information group and the second simulation condition from each of the simulators; and recognizing a second highest evaluation value group based on the second operation objective function among the received plurality of second evaluation value groups and recognizing a distribution of the plurality of second evaluation value groups.

According to this configuration, it is possible to evaluate the plurality of first evaluation value groups of the simulation process result using the first operation objective function, recognize the first highest evaluation value group based on the first operation objective function, and recognize a second highest evaluation value group and the distribution of a plurality of second evaluation value groups different from the plurality of first evaluation value groups corresponding to the second refinement condition and the second simulation condition using a second operation objective function set by referring to the distribution of the plurality of first evaluation value groups. Therefore, for example, when an administrator determines whether there is an appropriate solution or an optimal operation more than a solution or an optimal operation based on the first refinement condition and the first operation objective function, it is possible to set the second operation objective function by referring to the distribution of the plurality of first evaluation value groups, recognize a solution or an optimal operation based on the second refinement condition and the second operation objective function, and recognize a solution or an optimal operation based on each of a plurality of refinement conditions and a plurality of operation objective functions so that the administrator can compare and examine the solutions or the optimal operations. Therefore, it is possible to examine a plurality of evaluation value groups and a plurality of highest evaluation value groups in a comprehensive way and from various viewpoints using the plurality of refinement conditions and the plurality of operation objective functions to recognize a more optimal operation.

Effects of the Invention

According to the present invention, it is possible to efficiently utilize hardware resources of a processing mechanism that executes a parallel simulation operation when performing operation simulation and to execute various simulation operations at lower cost and at high speed to recognize an optimal operation even when an enormous number of cases are assumed as in small-volume production in great varieties.

BRIEF DESCRIPTION OF DRAWINGS

FIG. 6 is a diagram illustrating an example of a simulation condition of the operational plan optimization device according to the first embodiment.

MODE FOR CARRYING OUT THE INVENTION

Operational Plan Optimization Device of First Embodiment

Figure 1:
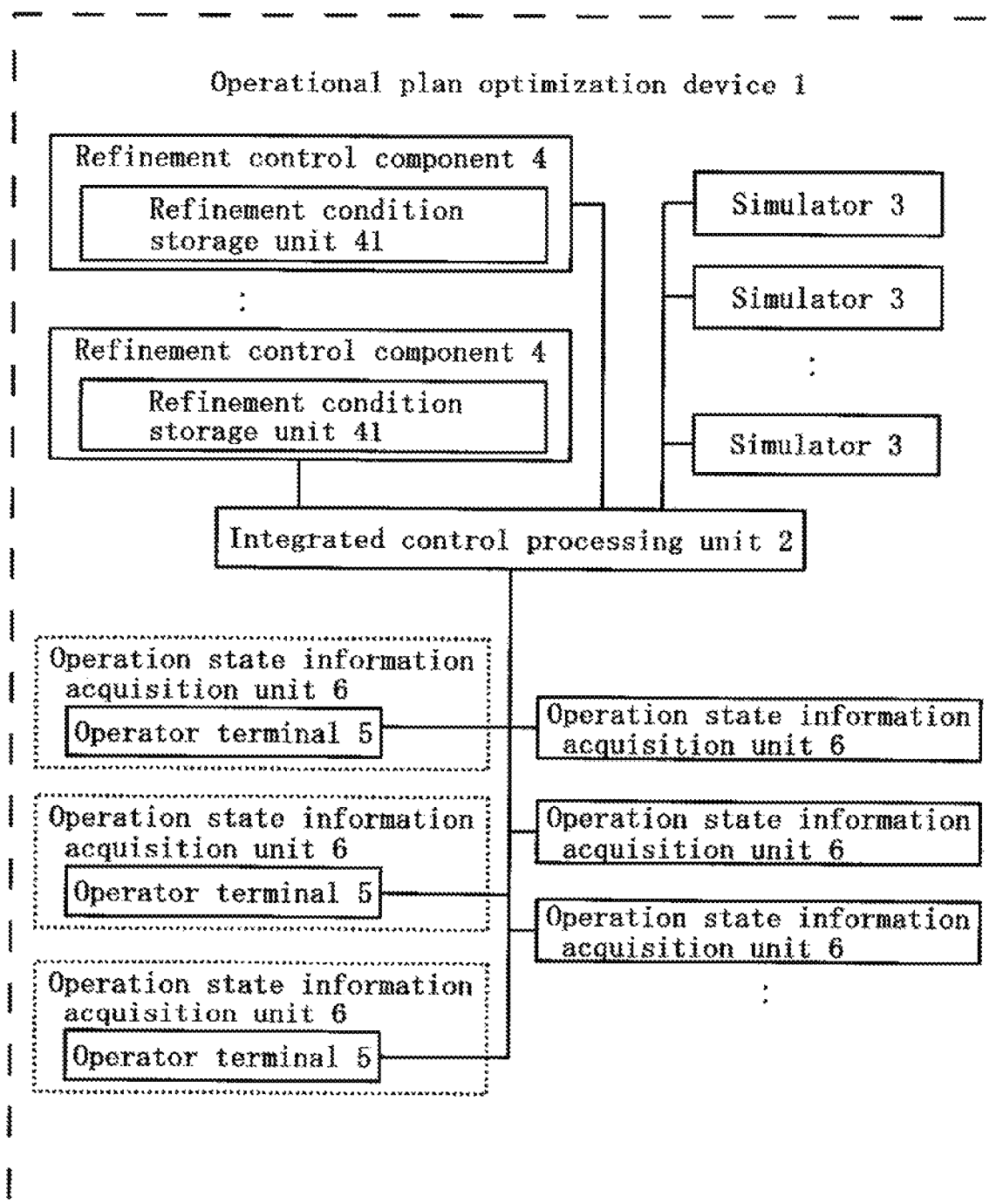
FIG. 1 is a block diagram illustrating an overall configuration of an operational plan optimization device according to a first embodiment of the present invention.

As illustrated in FIG. 1, an operational plan optimization device 1 according to a first embodiment of the present invention is a processing mechanism of a parallel simulation operation, including an integrated control processing unit 2, a plurality of simulators 3 which are communicably connected to the integrated control processing unit 2 and are controlled integrally, a refinement control component 4 that is communicably connected to the integrated control processing unit, a plurality of operator terminals 5 which are held by an operator or are disposed near an operator, and a plurality of operation state information acquisition units 6 that acquires operation state information. Discrete simulation processes of an operation are executed in parallel by a number of simulators 3 provided in parallel.

Figure 2:
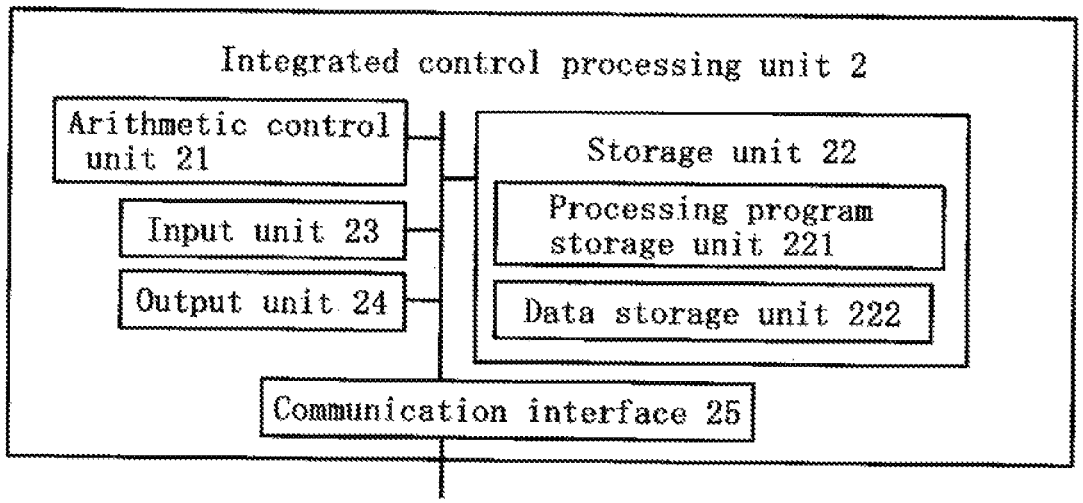
FIG. 2 is a block diagram illustrating a configuration of an integrated control processing unit of the operational plan optimization device according to the first embodiment.

The integrated control processing unit 2 is configured as a server that integrally controls an overall discrete simulation process of the operational plan optimization device 1, for example. As illustrated in FIG. 2, the integrated control processing unit 2 includes an arithmetic control unit 21 such as a CPU, a storage unit 22 configured as a ROM, a RAM, a hard disk, or the like, an input unit 23 such as a mouse or a keyboard, an output unit 24 such as a display and a printer, and a communication interface 25.

The storage unit 22 includes a processing program storage unit 221 that stores a processing program such as an integral processing program of an operation simulation for causing the arithmetic control unit 21 to execute a predetermined process and a data storage unit 222 that stores data necessary for performing a predetermined process, and the arithmetic control unit 21 executes an integral control process of a predetermined operation simulation according to an integral processing program. An operation objective function that recognizes a highest evaluation value group among a plurality of evaluation value groups is changeably set in the integral processing program of the processing program storage unit 221.

An operation objective function is set by an appropriate method capable of recognizing a highest evaluation value group among a plurality of evaluation value groups. For example, the operation objective function can set a weighting factor for each evaluation value to acquire a weighted linear sum and recognize an evaluation value group having a largest weighted linear sum as a highest evaluation value group. The operation objective function that recognizes an evaluation value group having the largest weighted linear sum as a highest evaluation value group includes, for example, a weighted linear sum of an evaluation value group made up of evaluation values, $S_i=w_1 \cdot V_{1i}+w_2 \cdot V_{2i}+w_3 \cdot V_{3i}+ \ldots +w_j \cdot V_{ji}+ \ldots +w_n \cdot V_{ni}$ ($w_j$: weighting factor, $V_{ji}$: evaluation value of evaluation value group, n: total number of evaluation values) and a MAX function of acquiring a largest value among the weighted linear sum $S_i$, MAX($S_i$, i=1, 2, . . . , t) (t: total number of weighted linear sums). The operation objective function is configured to recognize an evaluation value group of which the weighted linear sum S which is an operation objective evaluation value is the largest among a plurality of evaluation value groups ($V_{1i}$, $V_{2i}$, $V_{3i}$, . . . , $V_{ji}$, . . . , $V_{ni}$) (i=1, 2, . . . , t) as a highest evaluation value group.

In an example in which an operation objective function includes a weighted linear sum $S_i$ and a MAX function Max($S_i$, i=1, 2, . . . , t) that acquires the largest value among the weighted linear sums $S_i$, it is possible to change a necessary weighting factor among weighting factors $w_j$ (j=1, 2, . . . , n) to appropriately change the operation objective function. Moreover, an appropriate evaluation value necessary for evaluation of an operation can be set and acquire as an evaluation value of an evaluation value group $V_{ji}$ (i=1, 2, . . . , t, j=1, 2, . . . , n). For example, an index indicating productivity such as the make-span ([production ending time]−[production starting time]), productivity per unit time (yield/work hour), and a facility operating rate (Σ(facility operating time)/(work hour)), an index for analyzing the flow of products such as blocking (Σ(production waiting time in which components are not produced)) and starving (Σ(non-operating time in a state in which facilities can be operated)), an index indicating an operation state of plant resources such as operators and molds such as an operator operating rate ([operator operation time]/[work hour]) and a tool operating rate ([tool operation time]/[work hour]), and an index related to the stock and the cost such as a total stock amount in production line (Σ[total staying time of each component in certain step]×[stock amount of component]) and a total stock cost in production line (Σ[total staying time of each component in certain step]×[stock amount of component]×[component cost]) can be used as the evaluation value $V_{ji}$.

Figure 3:
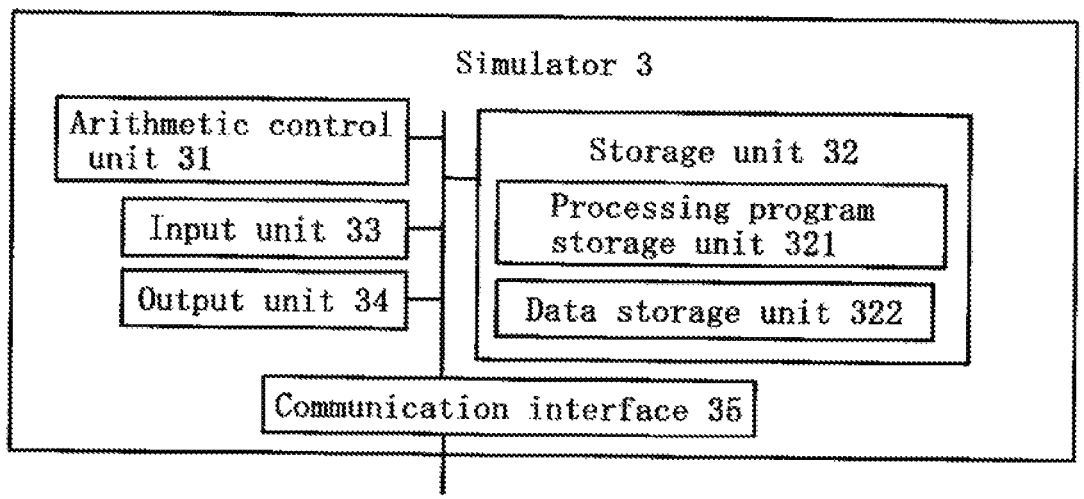
FIG. 3 is a block diagram illustrating a configuration of a simulator of the operational plan optimization device according to the first embodiment.

Each of the simulators 3 is configured as a computer that performs a partial process of the discrete simulation process of the operational plan optimization device 1, for example. As illustrated in FIG. 3, the simulator 3 includes an arithmetic control unit 31 such as a CPU, a storage unit 32 configured as a ROM, a RAM, or a hard disk, an input unit 33, an output unit 34, and a communication interface 35. A plurality of simulators 3 and the integrated control processing unit 2 are communicably connected by the communication interfaces 35 and 25 via wired communication, wireless communication, or combination of wired communication and wireless communication and are communicably connected at least during execution of an operation simulation process.

The storage unit 32 includes a processing program storage unit 321 that stores a processing program such as a simulation program of an operation simulation for causing the arithmetic control unit 31 to execute a predetermined process and a data storage unit 322 that stores data necessary for performing a predetermined process such as environment information of a basic production line that executes operations such as production. The arithmetic control unit 31 executes a predetermined simulation process according to a simulation process.

The refinement control component 4 is configured as a computer including an arithmetic control unit such as a CPU, a storage unit configured as a ROM, a RAM, or a hard disk, an input unit, an output unit, and a communication interface or a hard disk, and is communicably connected to the integrated control processing unit 2 via the communication interface 25. Communicable connection of the integrated control processing unit 2 with respect to the plurality of refinement control components 4 may be realized appropriately when it is necessary to connect to a necessary refinement control component 4, and the refinement control component 4 in which the refinement condition used by the integrated control processing unit 2 for generating a simulation condition can be switched or changed. As illustrated in FIG. 1, a refinement condition storage unit 41 is provided in a storage area of each of the refinement control components 4, and the refinement condition is stored in the refinement condition storage unit 41.

The refinement condition stored in the refinement condition storage unit 41 of the refinement control component 4 is input to the integrated control processing unit 2 communicably connected thereto, and the arithmetic control unit 21 of the integrated control processing unit 2 generates a simulation condition on the basis of the refinement condition and an operation state information group according to the integral processing program. In the present embodiment, the refinement condition stored in the refinement condition storage unit 41 is configured such that a degree of refinement can be changed. For example, the arithmetic control unit 21 of the integrated control processing unit 2 generates the simulation condition on the basis of a refinement condition made up of individual refinement condition groups in a state of being stored in the refinement condition storage unit 41 or a refinement condition of a necessary degree of refinement made up of individual refinement condition groups changed and input by the input unit 23 and an operation state information group.

As an example of a refinement condition of which the degree of refinement can be changed, stored in the refinement condition storage unit 41, individual refinement condition groups such as individual refinement condition NC1, individual refinement condition NC2, . . . , and individual refinement condition NCn are set. As an example of a specific content thereof, the degrees of refinement of one or a plurality or all of individual refinement conditions are changeably set such that the range of number of operators is between 5 and 15, the candidates of routing in which a product flows along a work station of a production plant are eight routes of R1, R2, R3, R4, R5, . . . , and R8, and a changeable range of the order of putting respective products in a production plan is 15% of the entire order. In this case, the individual refinement condition groups that form the refinement condition of a necessary degree of refinement is individual refinement conditions NC1 to NCn being stored in the refinement condition storage unit 41 or individual refinement conditions NC1', NC2', ..., and NCn' which are partially or entirely changed and input by the input unit 23 (for example, the range of number of operators is between 5 and 10, the candidates of routing in which a product flows along a work station of a production plant are seven routes of R1, R2, R3, R4, ..., and R7, and a changeable range of the order of putting respective products in a production plan is 10% of the entire order).

Individual refinement condition groups of different degrees of refinement may be stored in the refinement condition storage unit 41 as the refinement condition of a plurality of degrees of refinement, and a simulation condition may be generated using an individual refinement condition group of a specific degree of refinement selected and input among them as the refinement condition. In this case, a first individual refinement condition group (for example, the range of number of operators is between 5 and 15, the candidates of routing in which a product flows along a work station of a production plant are seven routes of R11, R12, R13, R14, ..., and R17, and a changeable range of the order of putting respective products in a production plan is 15% of the entire order) of the individual refinement conditions NC1, NC2, ..., and NCn, a second individual refinement condition group (for example, the range of number of operators is between 5 and 10, the candidates of routing in which a product flows along a work station of a production plant are six routes of R21, R22, R23, R24, ..., and R26, and a changeable range of the order of putting respective products in a production plan is 10% of the entire order) of second individual refinement conditions NC1', NC2', ..., and NCn' of a different degree of refinement from the first individual refinement condition group, and a third individual refinement condition group of a different degree of refinement from the first and second individual refinement condition groups are stored in the refinement condition storage unit 41, and an individual refinement condition group of a specific degree of refinement selected and input by the input unit 23 among these individual refinement condition groups is used as a refinement condition for generating the simulation condition.

Figure 4:
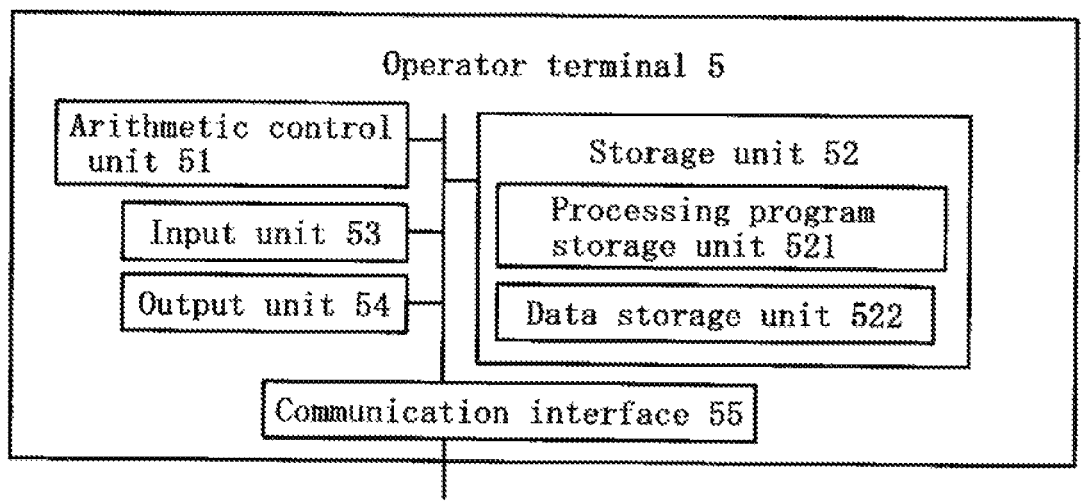
FIG. 4 is a block diagram illustrating a configuration of an operator terminal of the operational plan optimization device according to the first embodiment.

The operator terminal 5 is a mobile information terminal such as a smartphone, a personal computer, or a special purpose terminal, for example. As illustrated in FIG. 4, the operator terminal 5 includes an arithmetic control unit 51 such as a CPU, a storage unit 52 configured as a ROM, a RAM, or a hard disk, an input unit 53 such as a touch panel, a mouse, or a keyboard, an output unit 54 such as a touch panel or a display, and a communication interface 55.

The storage unit 52 includes a processing program storage unit 521 that stores a processing program such as an operation state information processing program for causing the arithmetic control unit 51 to execute a predetermined process on operation state information and a data storage unit 522 that stores data necessary for performing a predetermined process, and the arithmetic control unit 51 executes a predetermined operation state information process according to an operation state information processing program.

The operation state information acquisition unit 6 acquires operation state information and transmits the acquired operation state information to the integrated control processing unit 2, and for example, includes an input unit or a reading unit, a communication interface, and a communication control unit such as an arithmetic control unit. For example, the operation state information acquisition unit 6 may have a configuration in which the operator terminal 5 having a function of acquiring input operation state information or acquiring operation state information read by the reading unit that reads an electroencephalogram, a body temperature, and the like and transmitting the operation state information to the integrated control processing unit 2 serves as the operation state information acquisition unit 6. Moreover, the operation state information acquisition unit 6 may be configured as an IoT-based device or a device part such as a device that acquires operating state information from an operating speed of a production machine such as a production robot, a working machine, an inspection device, or a transport device and transmitting the operating state information to the integrated control processing unit 2 or a device that reads a barcode, a marking, or an IC tag of a product or a component using a reading unit and acquires information on completion status of the product or the component and transmits the information to the integrated control processing unit 2. Furthermore, the operation state information acquisition unit 6 may have a configuration in which operating state information such as an operating speed of a production machine by short-range communication connection is transmitted to the operator terminal 5, and the operator terminal 5 transmits the operating state information to the integrated control processing unit 2.

Figure 5:
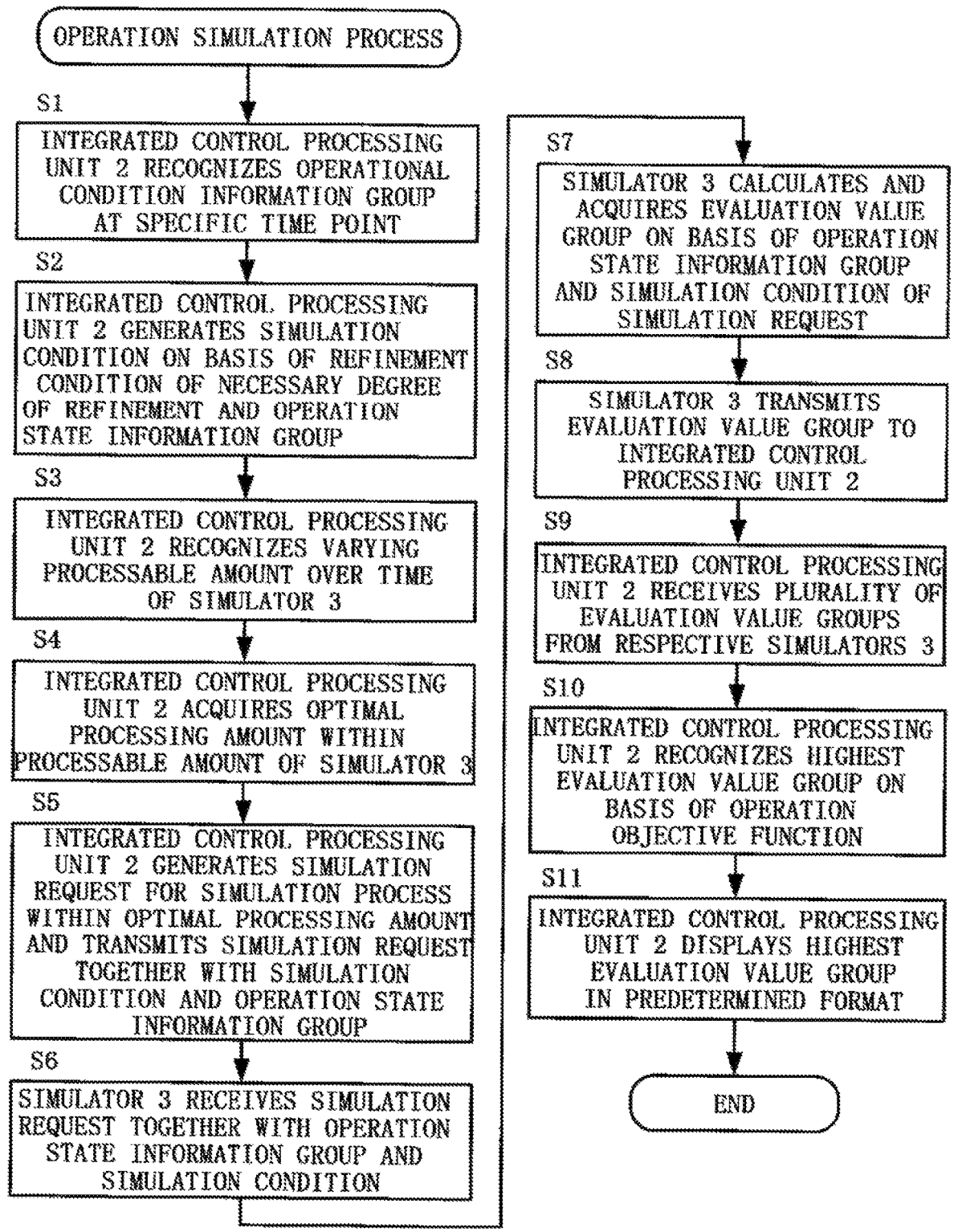
FIG. 5 is a flowchart illustrating an operation simulation process of the operational plan optimization device according to the first embodiment.

In the operation simulation process or the operational plan optimization process by the operational plan optimization device 1 according to the first embodiment, as illustrated in FIG. 5, the operation state information is transmitted from each operation state information acquisition unit 6 to the integrated control processing unit 2, and the integrated control processing unit 2 receives and acquires the operation state information and recognizes the operation state information group at a specific time point, made up of pieces of operation state information (S1). The transmission of the operation state information from the operation state information acquisition unit 6 to the integrated control processing unit 2 is performed every predetermined time interval, upon completion of a predetermined operation, approximately on a real-time basis, or on combination thereof, and the integrated control processing unit 2 receives and acquires the pieces of operation state information to determine and recognize an operation state information group of a specific time point. Moreover, the operation state information stored in the integrated control processing unit 2 includes information that is stationary in a short period such as a type of a production machine, and the stationary information may be received from the operation state information acquisition unit 6 at an appropriate timing or may be stored in advance in the integrated control processing unit 2.

Here, examples of the operation state information acquired by the integrated control processing unit 2 include information related to a work station such as a component storage station, an assembly station, or a shipping station (a work station ID, an operation target serial number, a target production amount of a work station, an actual production amount of a work station, an operation starting time, an operation ending time, an operator ID of an operator having worked in a work station, a mold ID of a mold used in a work station, a stage replacement time, a temperature, a humidity, and an atmospheric pressure), operator-related information (an operator ID, an operation starting time, a work hour, a break time, a serial number of a component on which an operation has been performed, an ID of a work station on which an operation has been performed, a walking route, and physical information such as a heart rate, a body temperature, and an electroencephalogram), mold-related information (a mold ID, a serial number of a component on which an operation has been performed, a work station ID thereof, a total number of shots, a total number of maintenance times, the number of shots after maintenance, and history of installation location), and component-related information (a serial number, a target shipping date, an arrival date, an operation starting date, an operation ending date, a shipping date, an ID of a work station on which an operation has been performed, an ID of used mold, an operator ID, a storage station ID, a period in which a component is placed in a storage station, and a temperature and a humidity in the period in which a component was placed in a storage station).

The work station-related information in the above-mentioned example is input to or read by a device that forms the operation state information acquisition unit 6 provided in a work station and is transmitted to the integrated control processing unit 2 by the device, for example. Moreover, the operator-related information in the above-mentioned example is input to or read by the operator terminal 5 that serves as the operation state information acquisition unit 6 and is transmitted to the integrated control processing unit 2 by the operator terminal 5. Moreover, the mold-related information and the component-related information in the above-mentioned example is read by the operation state information acquisition unit 6 having a function of reading information sequentially written to an IC tag provided on a mold and a component, for example, and is transmitted to the integrated control processing unit 2 by the operation state information acquisition unit 6.

The integrated control processing unit 2 generates a simulation condition on the basis of a refinement condition of a necessary degree of refinement made up of the individual refinement condition group changed and input by the input unit 23 and an operation state information group of a recognized specific time point with respect to the necessary individual refinement condition group being stored in the refinement condition storage unit 41 of the refinement control component 4, for example, and stores the simulation condition in the data storage unit 222 (S2). For example, when the refinement condition of the necessary degree of refinement is individual refinement conditions NC1', NC2', . . . , NCn' that form the individual refinement condition group (for example, the range of number of operators is between 5 and 10, the candidates of routing in which a product flows along a work station of a production plant are fifteen routes of R11, R12, R13, R14, . . . , and R25, and a changeable range of the order of putting respective products in a production plan is 10% of the entire order), the operation state information group of the recognized specific time point is AS1, AS2, . . . , and ASn (for example, information indicating that the number of operators is 8, information indicating that products to be produced are P1 to P10, information indicating that production of products P1 to P5 has been completed among production target products P1 to P10, information indicating that the route selected for product P6 is R11, information indicating that product P6 has progressed to steps 3 to 12 in the route R11, information indicating that the number of in-process stocks in each work station of product P6 is 2 for step 3, 6 for step 4, . . . , and 3 for step 12, information indicating that production of products P7 to P10 has not started yet, and information indicating the locations of respective operators at respective time points), the individual refinement conditions NC1', NC2', . . . , and NCn' and the operation state information AS1, AS2, . . . , and ASn are combined, and operation state information of which the condition range is narrower than the individual refinement conditions NC1', NC2', . . . , and NCn' of the refinement condition of the necessary degree of refinement is present among the pieces of operation state information AS1, AS2, . . . , and ASn, a generation condition group [AS1, AS2, . . . , and NCn'] to which the narrower condition is applied (for example, information indicating that the number of operators is 8, information indicating that products to be produced are P1 to P10, information indicating that production of products P1 to P5 has been completed among production target products P1 to P10, information indicating that the route selected for product P6 is R11, information indicating that product P6 has progressed to steps 3 to 12 in the route R11, information indicating that the number of in-process stocks in each work station of product P6 is 2 for step 3, 6 for step 4, . . . , and 3 for step 12, information indicating that production of products P7 to P10 has not started yet, information indicating the locations of respective operators at respective time points, and a changeable range of the order of putting respective products in a production plan is 10% of the entire order) is acquired, and the simulation conditions SC1, SC2, . . . , SCi, . . . , and SCn are generated according to the generation condition group.

The simulation condition SCi is made up of a plurality of individual conditions $sc_{i1}$, $sc_{i2}$, . . . , and $sc_{im}$ (that is, a plurality of individual condition groups) and is represented by a simulation condition SCi=[$sc_{i1}$, $sc_{i2}$, . . . , and $sc_{im}$]. FIG. 6 illustrates an example of the simulation conditions SC1, SC2, . . . , SCi, . . . , and SCn represented by a plurality of individual condition groups $sc_{i1}$, $sc_{i2}$, . . . , and $sc_{im}$.

As illustrated in FIG. 5, the integrated control processing unit 2 (specifically, the integrated control processing unit 2 of the operational plan optimization device 1, more specifically, the arithmetic control unit 21 based on the integral processing program) recognizes a varying processable amount over time within a certain period, of each of the simulators 3 (S3). As a specific example, the integrated control processing unit 2 acquires indices such as a CPU performance, a CPU operating rate, a memory capacity, and a memory operating rate of the simulator 3 at a predetermined timing and calculates, acquires, and recognizes a processable amount from these process indices.

In the processable amount recognition process, the fixed-value index such as a CPU performance and a memory capacity of each simulator 3 may be stored in advance in the data storage unit 222 of the integrated control processing unit 2, and the integrated control processing unit 2 may acquire the index of a variation in a CPU operating rate or a memory operating rate of the simulator 3 at a predetermined timing and calculate, acquire, and recognize a processable amount from the acquired index of the variation and the fixed-value index stored in advance. Moreover, the predetermined timing at which the integrated control processing unit 2 acquires the index of the simulator 3 can be set to, for example, when an operation simulation process starts and when a plurality of evaluation value groups is received from the simulator 3 and the completion of the simulation process of the simulator 3 is recognized.

The integrated control processing unit 2 of the operational plan optimization device 1 calculates and acquires an optimal processing amount within the processable amount in a certain period of the simulator 3 by multiplying the processable amount by a load reduction rate stored in the data storage unit 222, for example (S4). A predetermined value is set as the load reduction rate so that the processing speed of the simulator 3 does not decrease or the simulator 3 does not stop in a lock state, for example. The predetermined period corresponding to the processable amount is stored in the data storage unit 222, and the integrated control processing unit 2 calculates and acquires the optimal processing amount from the index of the variation in the CPU operating rate and the memory operating rate of the simulator 3 and the predetermined period stored in the data storage unit 222. The predetermined period can be set appropriately. For example, as will be described later, when there is a target processing time for completing the process of recognizing the highest evaluation value group based on the operation objective function among the plurality of evaluation value groups after the integrated control processing unit 2 transmits the simulation request to the simulator 3 together with the corresponding operation state information group and the corresponding simulation condition, the target processing time may be set as the predetermined period or a predetermined period of a predetermined percentage of the target processing time may be set as the predetermined period. When the predetermined period of the predetermined percentage of the target processing time is set as the predetermined period, the target processing period and the predetermined percentage may be stored in the data storage unit 222 and the integrated control processing unit 2 may calculate and acquire the predetermined period on the basis of the target processing time and the predetermined percentage and store the predetermined period in the data storage unit 222.

Subsequently, the integrated control processing unit 2 generates a simulation request for the simulation process within the optimal processing amount of the simulator 3 and transmits the simulation request to the simulator 3 together with the corresponding operation state information group and the corresponding simulation condition (S5). When the simulation request for the simulation process within the optimal processing amount is to be generated, the integrated control processing unit 2 may execute a simulation process with respect to an arbitrary pattern of the combination of the operation state information group and the simulation condition, integrates the processing amount to recognize the number of simulation requests within the optimal processing amount, and sequentially generate the recognized number of simulation requests in the order of the set simulation conditions. Alternatively, the integrated control processing unit 2 may integrate the processing amount of an arbitrary pattern of the combination of the operation state information group and the simulation condition from the number of pieces of operation state information of the operation state information group and the number of individual conditions of the simulation condition, recognize the number of simulation requests within the optimal processing amount from the processing amount, and generate the recognized number of simulation requests in the order of the set simulation conditions.

When the integrated control processing unit 2 transmits the simulation request together with the corresponding operation state information and the corresponding simulation condition, simulation request R1[AS1, AS2, . . . , ASn, SC1], simulation request R2[AS1, AS2, . . . , ASn, SC2], simulation request R3[AS1, AS2, . . . , ASn, SC3], and the like are transmitted to the simulator 3. Although the processes of S3 to S5 are executed sequentially with respect to a plurality of simulators 3 provided in parallel, when the simulation request corresponds to the same operation state information group and the simulation conditions generated in series in step S2, the integration of the processing amount of an arbitrary pattern of the combination of the operation state information group and the simulation condition preferably uses the integrated processing amount which has been calculated and acquired in advance and has been stored in advance.

The simulator 3 receives the simulation request and the corresponding operation state information group and the corresponding simulation condition from the integrated control processing unit 2 (S6). Moreover, the simulator 3 (more specifically, the arithmetic control unit 31 based on the simulation program) calculates and acquires an evaluation value group as the simulation process result based on the operation state information group and the simulation condition of the simulation request (S7). When the evaluation value group is to be calculated and acquired, the arithmetic control unit 31 executes a discrete simulation process and calculates and acquires each of the evaluation values $V_{1i}$, $V_{2i}$, $V_{3i}$, . . . , $V_{ji}$, . . . , $V_{ni}$ that forms the evaluation value group from the operation state information group [AS1, AS2, . . . , ASn] and the simulation condition SCi=[$sc_{i1}$, $sc_{i2}$, . . . , $sc_{im}$] of the simulation request Ri.

Here, in the discrete simulation process executed by the simulator 3, an appropriate discrete simulation process that simulates a state progress based on a chain of events occurring discretely can be used. For example, various existing discrete simulation processes can be used, such as a simulation process of setting and storing another element such as another work station as an output destination to be notified of the end of a specific operation to the data storage unit 322 together with the specific operation induced by each of elements such as a work station, conditions for inducing the specific operation of each element, and the specifications of a required amount such as an operating time of the specific operation and a necessary number of components, setting the simulation program of the processing program storage unit 321 so that the specific operation of another element is induced according to the output of the specific operation to connect the respective elements as a network, inducing the specific operation on an element serving as the root of the operation process network so that induction of the specific operation propagates to respective elements of the network connected to the root and the simulation operation (that is, the operation process) progresses. The operation state information group [AS1, AS2, . . . , ASn] and the simulation condition SCi are used as the calculation condition when the discrete simulation process is calculated.

Preferably, as in Patent Document 2, a discrete simulation process may be executed such that the specifications of a facility element is stored in the data storage unit 322 as facility element information, operation element information including an induction condition of an operation element and an output destination after completion of an operation and link information between a facility element and an operation element are stored in the data storage unit 322, a first facility element executes an operation when the induction condition of the operation element information of a first operation element linked to the first facility element by the link information is satisfied, and an execution result is output to the output destination after completion of the operation of the operation element information of the first operation element. In this case, the operation state information group [AS1, AS2, . . . , ASn] and the simulation condition SCi are used as the calculation condition for the discrete simulation process. Information necessary for the discrete simulation process such as basic information of a present operation such as the specifications of elements other than the operation state information group and the simulation condition or environment information of a present operation may be input to the integrated control processing unit 2, transmitted to the respective simulators 3, and stored in the respective simulators 3. Alternatively, the necessary information may be input to the respective simulators 3 and stored in the respective simulators 3.

After that, the simulator 3 transmits the calculated and acquired evaluation value group [$V_{1i}$, $V_{2i}$, $V_{3i}$, ..., $V_{ji}$, ..., $V_{ni}$] to the integrated control processing unit 2 (S8). The integrated control processing unit 2 receives a plurality of evaluation value groups as the simulation process result based on the operation state information group and the simulation condition from the respective simulators 3 having executed the simulation process (S9) and recognizes a highest evaluation value group based on the operation objective function among a plurality of evaluation value groups which are all received evaluation value groups (S10). As described above, in recognition of the highest evaluation value group, it is possible to set a weighting factor for each evaluation value to acquire a weighted linear sum and recognize an evaluation value group having a largest weighted linear sum as a highest evaluation value group.

Furthermore, the integrated control processing unit 2 displays the recognized highest evaluation value group to the output unit 24 in a predetermined format (S11). As an example of the display format, the values of the weighted linear sums of the highest evaluation value group and the other evaluation value groups may be displayed as a graph. Moreover, Preferably, the integrated control processing unit 2 may recognize the highest evaluation value group, recognize a distribution of a plurality of evaluation value groups including the highest evaluation value group and the other evaluation value groups, and display the distribution of the plurality of evaluation value groups or a distribution of operation objective evaluation values such as the weighted linear sum of the respective evaluation value groups on the output unit 24. As an example of the format of recognition and output of the distribution, the vertical axis may be a make-span or a lead time and the horizontal axis may be an integral value of the stock amount. Moreover, the vertical axis may be the operating rate of a facility and the horizontal axis may be an operating rate of an operator. In this way, the distribution may be output using the evaluation value corresponding to each evaluation value group.

According to the first embodiment, the integrated control processing unit 2 can recognize the varying processable amount over time of each of the simulators 3 to cause the respective simulators 3 to perform a simulation process within the optimal processing amount in the processable amount, efficiently utilize hardware resources of a processing mechanism that executes a parallel simulation operation, execute various simulation operations at lower cost and at high speed even when an enormous number of cases are assumed as in small-volume production in great varieties. That is, by allocating an appropriate simulation process amount depending on a processing performance at a predetermined time point of the individual simulators 3, it is possible to reliably perform various simulation operations at high speed while preventing application of an excessive load to the individual simulators 3 to prevent decrease in a processing speed and stopping of the simulator 3. Moreover, the integrated control processing unit 2 receives a plurality of evaluation value groups as the simulation process result based on the operation state information group and the simulation condition from the plurality of simulators 3 and recognizes the highest evaluation value group based on the operation objective function among the plurality of evaluation value groups. In this way, it is possible to recognize an optimal operation which complies with an operation objective and an operation state.

Since the operation state information is transmitted from the operation state information acquisition unit 6 to the integrated control processing unit 2, the integrated control processing unit 2 can automatically recognize the operation state information from the operation state information acquisition unit 6 to cause the simulator group 3 to perform a simulation process, recognize a highest evaluation value group which complies with an operation objective and an operation state, and recognize an optimal operation.

Moreover, since the integrated control processing unit 2 generates the simulation condition on the basis of the refinement condition of the refinement control component 4 and the operation state information, it is possible to sequentially generate necessary simulation conditions and use the same in a simulation process. Therefore, it is possible to eliminate the need to prepare hardware that generates a list of patterns of an enormous number of simulation conditions corresponding to operation state information by a simulation operation. Therefore, it is possible to reduce the cost of hardware resources using hardware resources efficiently. Moreover, since the number of simulation conditions increases enormously when the number of combinations of conditions increases, it is possible to remove unnecessary simulation conditions to reduce the enormous number of simulation conditions to obtain a number of processable simulation conditions with the refinement condition to thereby execute operation for optimization and to reduce the cost of hardware resources. Moreover, it is possible to set a more appropriate refinement condition of the refinement control component 4 in compliance with characteristics of market conditions, characteristics of production lines, manufacturing management policies such as setting the delivery priority corresponding to a customer request in a production plan and setting the priority of a production facility to be operated actively from the viewpoint of depreciation of facilities and quality management, for example. Therefore, the integrated control processing unit 4 can generate a more appropriate simulation condition and use the same in a simulation process. Furthermore, since the refinement control component 4 and the integrated control processing unit 2 are communicably connected rather than being integrated, it is possible to use an appropriate refinement condition and an appropriate simulation condition flexibly as necessary and to improve the flexibility, the diversity, and the versatility of the simulation process.

The degree of refinement of the refinement condition of the refinement control component 4 can be changed, or the refinement conditions of a plurality of degrees of refinement are set to the refinement control component 4. For example, when an administrator determines that the result of a first highest evaluation value group obtained on the basis of a first refinement condition needs to be simulated using a different condition, it is possible to obtain the result of a second highest evaluation value group using a second refinement condition of a weaker degree of refinement than the first refinement condition or to recognize an optimal evaluation value group and an optimal operation among the highest evaluation value groups obtained on the basis of the plurality of refinement conditions. In this way, it is possible to attain a highest evaluation value group and an optimal operation which are considered to be optimal from artificial determination or are considered to be optimal from a simulation process based on a plurality of refinement conditions without strengthening the degree of refinement too much and eliminating the evaluation value group from an evaluation target.

Operational Plan Optimization Device of Second Embodiment

Figure 7:
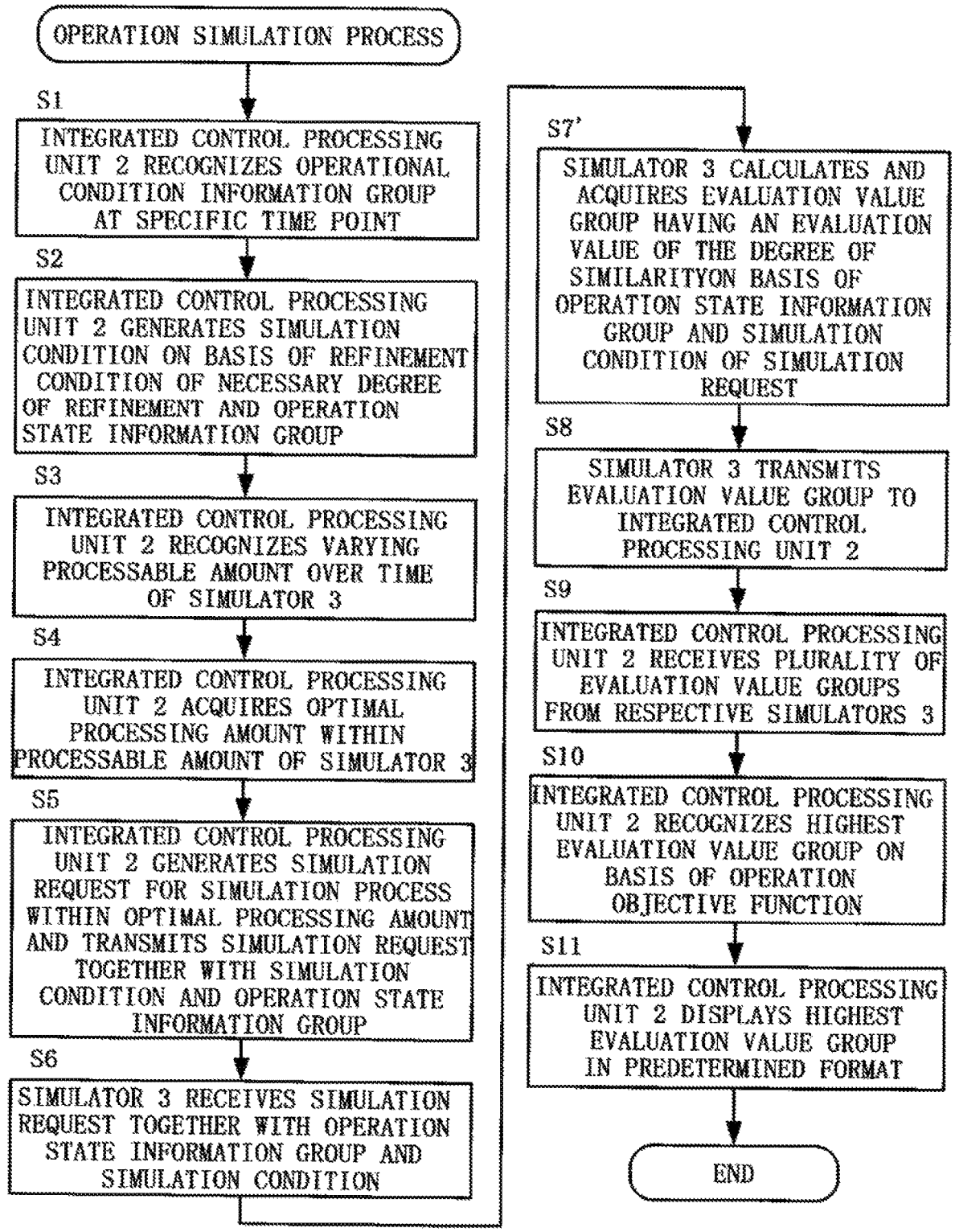
FIG. 7 is a flowchart illustrating an operation simulation process of an operational plan optimization device according to a second embodiment.

An operational plan optimization device 1 according to a second embodiment of the present invention has an overall configuration similar to that of the first embodiment illustrated in FIGS. 1 to 4, but is different in that the evaluation values $V_{1i}$, v2j, $V_{3i}$, ..., $V_{ji}$, ..., and $V_{ni}$ that form the evaluation value group include an evaluation value indicating a degree of similarity to a present operation. As illustrated in FIG. 7, the individual simulators 3 calculate and acquire an evaluation value group having an evaluation value of the degree of similarity as the simulation process result based on the operation state information group and the simulation condition of the simulation request (S7'). The integrated control processing unit 2 receives an evaluation value group having a plurality of degree-of-similarity evaluation values as the simulation process result based on the operation state information group and the simulation condition from the respective simulators 3 having executed the simulation process (S9) and recognizes a highest evaluation value group having a degree-of-similarity evaluation value based on the operation objective function among a plurality of evaluation value groups which are all the received evaluation value groups (S10). The other configuration and processing method are similar to those of the first embodiment.

As an example of a method of calculating and acquiring an evaluation value of a degree of similarity to the present operation, an appropriate method such as an existing method of representing an individual degree of similarity between a present routing pattern of a work station along which a product flows and a virtually changed routing pattern of a work station along which the product flows and an individual degree of similarity between a present pattern of a work station handled by an operator and a virtually changed pattern of a work station handled by the operator, etc. using multi-dimensional vectors and calculating and acquiring the distance between vectors may be used. Moreover, individual degrees of similarity $sr_1$, $sr_2$, ..., and $sr_n$ may be multiplied by the weighting factors $sw_1$, $sw_2$, ... and $sw_n$ stored in the data storage unit 322 of the simulator 3 to calculate and acquire a weighted linear sum of the individual degrees of similarity $sw_1 \cdot sr_1 + sw_2 \cdot sr_2 + \ldots + sw_n \cdot sr_n$ as the degree-of-similarity evaluation value. Here, the individual degree of similarity can be evaluated by scoring the degree of commonness, a distance, or the like. For example, an individual degree of similarity $sr_i$ between a present routing pattern of a work station and a virtually changed routing pattern of a work station may increase as the proportion of a common work station that the route set as the routing passes increases, the proportion of a common work station having the same type of function increases, and the proportion of work stations at a close physical distance, in which the same operation element is performed among the work stations on the route set as the routing increases, for example.

According to the second embodiment, since the degree of similarity to a present operation is included in the evaluation value group as an evaluation value, it is possible to recognize an optimal operation that is easily performed at the site and by an operator without changing an existing operation method remarkably. For example, when an evaluation value group is made up of indices related to production only, production corresponding to the highest evaluation value group may include production including a production method which is difficult to cope with and which has not been experienced in executing production actually, production which involves a drastic change in layout which may impose burden on a production site, or production of which the production policy is greatly different from a conventional production policy. However, when the degree of similarity to a present operation is included in the evaluation value of an evaluation value group, it is possible to recognize "optimal production which is easy to produce and is easy to perform and which is not changed greatly from an existing method" in a production site.

Operational Plan Optimization Device of Third Embodiment

Figure 8:
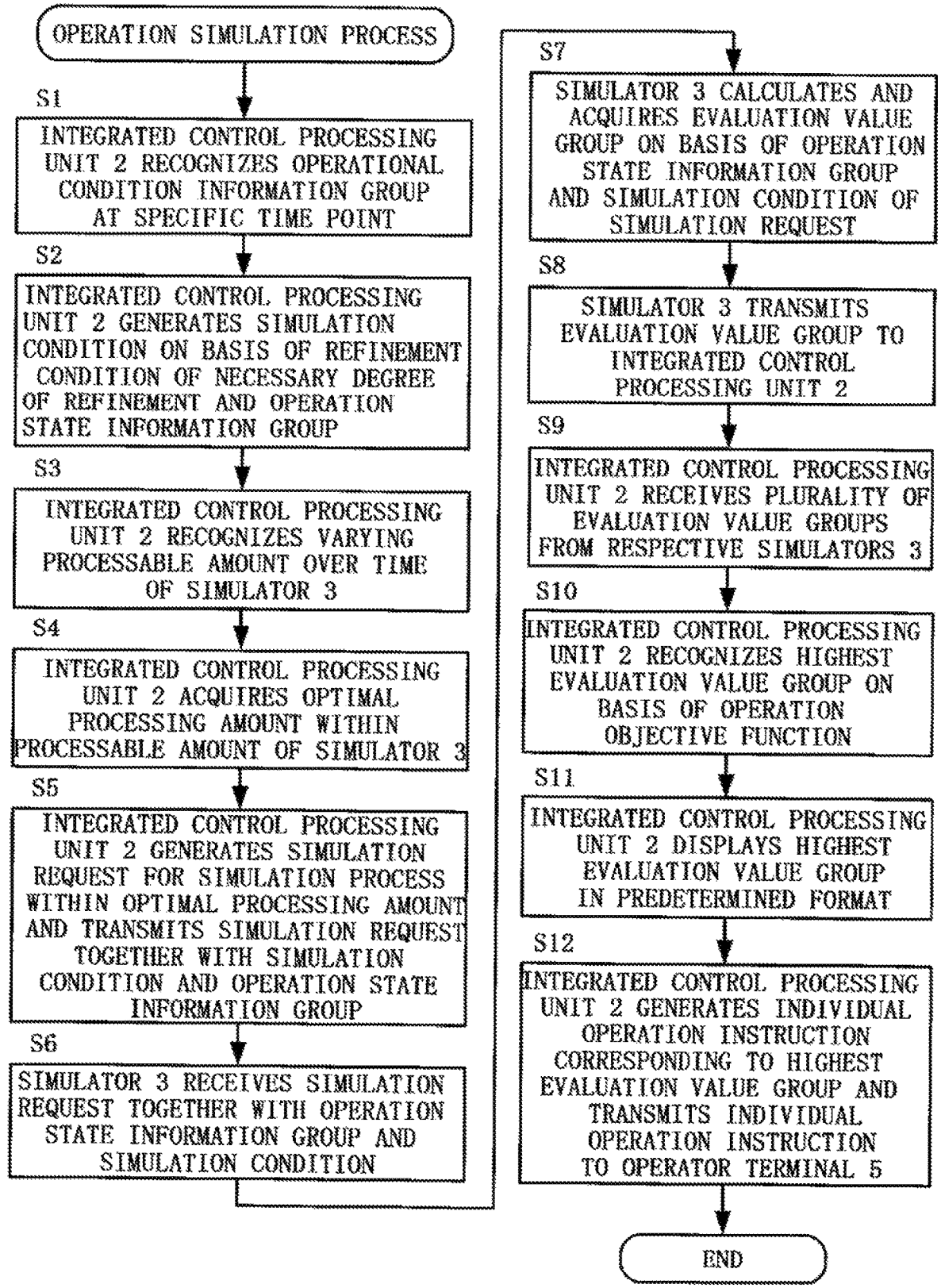
FIG. 8 is a flowchart illustrating an operation simulation process of an operational plan optimization device according to a third embodiment.

An operational plan optimization device 1 according to a third embodiment has an overall configuration similar to that of the first embodiment illustrated in FIGS. 1 to 4. As illustrated in FIG. 8, the integrated control processing unit 2 displays the recognized highest evaluation value group in a predetermined format with the aid of the output unit 24 (S11), generates an individual operation instruction corresponding to the recognized highest evaluation value group and transmits the individual operation instruction to at least the operator terminal 5 approximately on a real-time basis (S12). The individual operation instruction is an operation instruction that an individual operation element executes or that is executed with respect to an individual operation element in an entire operation corresponding to the highest evaluation value group. The individual operation instruction is preferably transmitted to as many units as possible that can receive the instruction such as the operation state information acquisition unit 6 capable of receiving the individual operation instruction in addition to the operator terminal 5. As an example of the individual operation instruction, operator H3 performs step 5 of product P6 in work station S008 from 10:30 to 10:40 and performs step 6 of product P10 in work station S010 from 10:40 to 10:55. The other configuration is similar to that of the operational plan optimization device 1 of the first embodiment.

According to the third embodiment, the highest evaluation value group and the optimal operation obtained from operation simulation can be immediately applied as an individual operation instruction, the individual operation instruction can be quickly delivered to an operator and the like, an optimal operation system can be established quickly, and an optimal operation can be executed speedily.

Operational Plan Optimization Device of Fourth Embodiment

Figure 9:
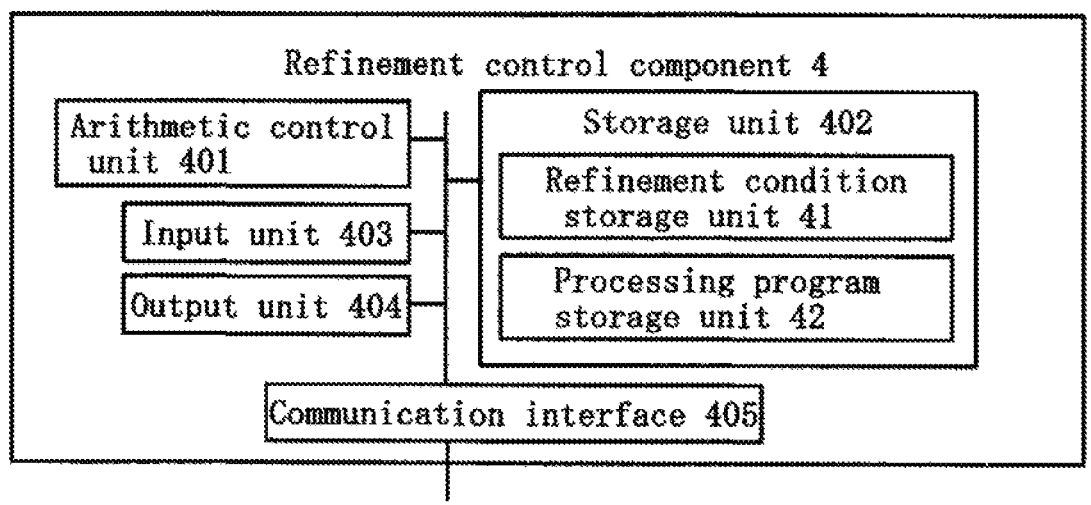
FIG. 9 is a block diagram illustrating a configuration of a refinement control component of an operational plan optimization device according to a fourth embodiment.

An operational plan optimization device 1 according to a fourth embodiment has an overall configuration similar to that of the first embodiment illustrated in FIGS. 1 to 4. As illustrated in FIG. 9, each of the plurality of refinement control components 4 is configured as a computer including an arithmetic control unit 401 such as a CPU, a storage unit 402 configured as a ROM, a RAM, a hard disk, or the like, an input unit 403, an output unit 404, and a communication interface 405. The refinement condition storage unit 41 is set in the storage unit 402, a refinement condition generation program is stored in the program storage unit 42, and the arithmetic control unit 401 operates according to the refinement condition generation program.

Figure 10:
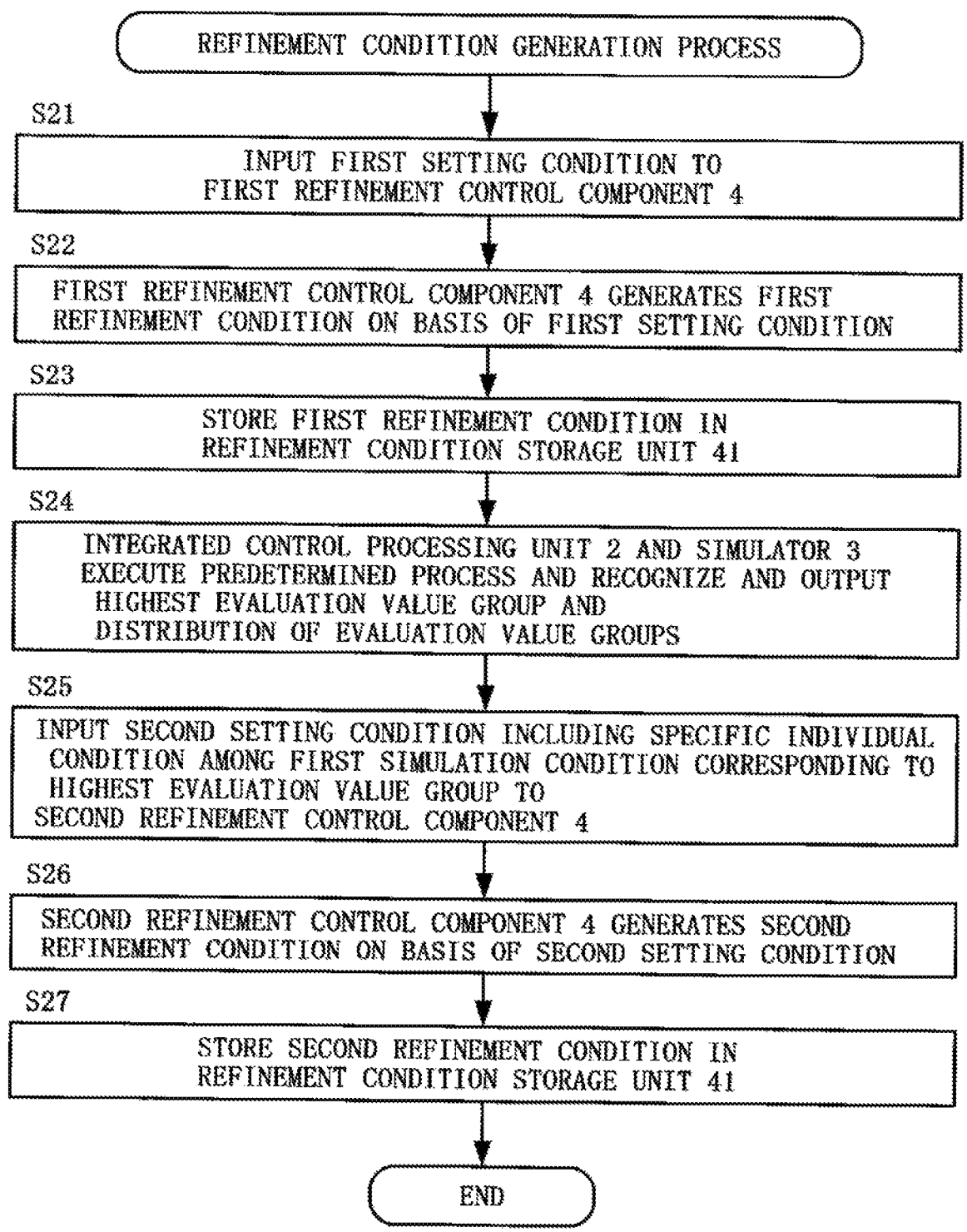
FIG. 10 is a flowchart illustrating a refinement condition generation process of the refinement control component of the operational plan optimization device according to the fourth embodiment.

As illustrated in FIG. 10, a first setting condition is input from the input unit 403 to a first refinement control component 4 of the plurality of refinement control components 4 (S21) and the arithmetic control unit 401 executes a process of generating a first refinement condition on the basis of the first setting condition (S22) and storing the generated first refinement condition in the refinement condition storage unit 41 of the storage unit 402 (S23).

For example, when "the range of number of operators is between 5 and 15, the candidates of routing in which a product flows along a work station of a production plant are nine routes of R1, R2, R3, R4, R5, . . . , and R9 (the smaller the routing number, the higher the degree of similarity), and a changeable range of the order of putting respective products in a production plan is 15% of the entire order" is input as the first setting condition, the arithmetic control unit 401 of the first refinement control component 4 performs a process according to a predetermined calculation rule (that is, a predetermined calculation rule for narrowing or extending a simulation range to an appropriate range) for reducing or increasing a calculation processing amount from the first setting condition to an appropriate amount according to the refinement condition generation program to generate a first refinement condition. As a specific example of the predetermined calculation rule, when "the number of operators to be used in the first refinement condition from the range of numbers of operators in the first setting condition is set to every second number from the starting number of operators", "the routing candidate to be used in the first refinement condition from the routing candidates in the first setting condition is set to every second candidate from the starting routing candidate", and "a round-robin combination of the routing candidates set by the set number of operators is set", the arithmetic control unit 401 generates individual refinement condition groups NC1, NC2, . . . , and NCn (for example, a changeable range of the orders of putting respective products in a production plan being 15% of the entire order, which is added to each of the round-robin combinations of the six kinds (5, 7, 9, 11, 13, and 15) of number of operators and the five kinds (R1, R3, R5, R7, and R9) of the candidates of routing in which a product flows along a work station of a production plant) that forms the first refinement condition according to the refinement condition generation program and stores the first refinement condition which narrows down the simulation range in the refinement condition storage unit 41 of the storage unit 402.

After that, the integrated control processing unit 2 generates and stores the first simulation condition based on the first refinement condition, transmits the simulation request, receives a plurality of evaluation value groups which is the simulation process result from the simulator 3, recognizes the highest evaluation value group, recognizes the distribution of the plurality of evaluation value groups, outputs the highest evaluation value group, and outputs the distribution of the plurality of evaluation value groups (S24). In contrast, when an administrator determines that it is necessary to perform simulation under a different condition, the first simulation conditions corresponding to the highest evaluation value group stored in the data storage unit 222 of the integrated control processing unit 2 are output and confirmed, and a specific individual condition among the first simulation conditions is input to the second refinement control component 4 as the second setting condition. The second setting condition is input from the input unit 403 to the second refinement control component 4 (S25), and the arithmetic control unit 401 executes a process of generating the second refinement condition on the basis of the second setting condition (S26) and storing the generated second refinement condition in the refinement condition storage unit 41 of the storage unit 402 (S27). After that, the integrated control processing unit 2 generates and stores the second simulation condition based on the second refinement condition, transmits the simulation request, receives the plurality of evaluation value groups which is the simulation process result from the simulator 3, recognizes the highest evaluation value group, recognizes the distribution of the plurality of evaluation value groups, outputs the highest evaluation value group, and outputs the distribution of the plurality of evaluation value groups.

For example, when the specific individual condition among the first simulation conditions corresponding to the highest evaluation value group is "number of operators is 9" and "routing is R5" and the specific individual condition is input as the second setting condition, the arithmetic control unit 401 of the second refinement control component 4 performs a process according to a predetermined calculation rule (that is, a predetermined calculation rule for narrowing or extending a simulation range to an appropriate range) for reducing or increasing a calculation processing amount from the second setting condition to an appropriate amount according to the refinement condition generation program to generate a second refinement condition. As a specific example of the predetermined calculation rule, when "the number of operators is set to be around the number of operators in the second setting condition", "the routing is set to be around the routing in the second setting condition", and "a round-robin combination of the routing candidates set by the set number of operators is set", etc., the arithmetic control unit 401 generates individual refinement condition groups NC1', NC2', . . . , and NCn' (for example, a changeable range of the orders of putting respective products in a production plan being 15% of the entire order, which is added to each of the round-robin combinations of the three kinds (8, 9, and 10) of number of operators and the three kinds (R4, R5, and R6) of the candidates of routing in which a product flows along a work station of a production plant) that forms the second refinement condition according to the refinement condition generation program and stores the second refinement condition which narrows down the simulation range in the refinement condition storage unit 41 of the storage unit 402.

Preferably, Like the first refinement control component 4 that generates the first refinement condition according to the first calculation rule for narrowing down the simulation range and the second refinement control component 4 that generates the second refinement condition according to the predetermined calculation rule for extending the simulation range in the above-described specific example, the plurality of refinement control components 4 can ideally optimize the simulation range by combination of one refinement control components 4 generating the refinement condition according to the predetermined calculation rule for narrowing down the simulation range from the setting condition and another refinement control components 4 generating the refinement condition according to the predetermined calculation rule for extending the simulation range from the setting condition. All the plurality of refinement control components 4 may generate the refinement condition according to the predetermined calculation rule for narrowing down the simulation range from the setting condition or may generate the refinement condition according to the predetermined calculation rule for extending the simulation range from the setting condition. Moreover, when one refinement control component 4 and another refinement control component 4 among the plurality of refinement control components 4 generate refinement conditions according to predetermined calculation rules for narrowing down the simulation range from the setting condition or one refinement control component 4 and another refinement control component 4 generate refinement conditions according to predetermined calculation rules for extending the simulation range from the setting condition, the predetermined calculation rule of the one refinement control component 4 and the predetermined calculation rule of the other refinement control component 4 may be different or the same. Moreover, when the same refinement control component 4 can selectively perform a process of generating the refinement condition according to the predetermined calculation rule for narrowing down the simulation range from the setting condition and a process of generating the refinement condition according to the predetermined calculation rule for extending the simulation range from the setting condition so that the refinement condition is generated according to the predetermined selected calculation rule, it becomes easy to obtain an appropriate simulation range. Furthermore, the simulation range can be optimized more easily when a plurality of refinement control components 4 capable of selectively performing the process is provided.

In the operational plan optimization device 1 and the operational plan optimization method according to the fourth embodiment, some or all of the predetermined calculation rules for generating the refinement condition from the setting condition may be input to the refinement control component 4 as a portion of the setting conditions, and the arithmetic control unit 401 that cooperates with the refinement condition generation program of the refinement control component 4 may generate the refinement condition from the setting condition on the basis of the refinement condition generation program and the portion of the setting conditions corresponding to the input predetermined calculation rules.

For example, when "the range of number of operators is between 5 and 15, the number of routing candidates in which a product flows along a work station of a production plant is one hundred routes of R1, R2, R3, R4, R5, . . . , and R100 (the smaller the routing number, the higher the degree of similarity), R30 is the routing (for example, a routing in which a result has been obtained) at the center of the routing candidates, and ten routings each before and after the central routing are set (some of the setting conditions corresponding to a portion of the predetermined calculation rule), and the like" is input to the first refinement control component 4 as the first setting condition, the arithmetic control unit 401 of the first refinement control component 4 generates the individual refinement condition groups NC1, NC2, . . . , and NCn (for example, other conditions which are added to each of the round-robin combinations of the eleven kinds (5 to 15) of number of operators and the twenty-one kinds (R20 to R40) of routings around the routing R30 in which a result has been obtained) that forms the first refinement condition according to the refinement condition generation program that stores a portion (the round-robin combination of the routing candidates set by the set number of operators) of the predetermined calculation rule on the basis of the portion of the setting condition corresponding to the portion of the predetermined calculation rule and executes the simulation process and acquires the highest evaluation value group.

Furthermore, when a specific individual condition among the first simulation conditions corresponding to the highest evaluation value group is "routing: R39" and "the range of number of operators is between 5 and 15, the number of routing candidates in which a product flows along a work station of a production plant is one hundred routes of R1, R2, R3, R4, R5, . . . , and R100 (the smaller the routing number, the higher the degree of similarity), R39 is the routing (for example, the routing of the specific individual condition among the first simulation conditions corresponding to the highest evaluation value group) at the center of the routing candidates, and ten routings each before and after the central routing are set (some of the setting conditions corresponding to a portion of the predetermined calculation rule), and the like" is input to the second refinement control component 4 as the second setting condition, the arithmetic control unit 401 of the second refinement control component 4 generates the individual refinement condition groups NC1', NC2', . . . , and NCn' (for example, other conditions which are added to each of the round-robin combinations of the eleven kinds (5 to 15) of number of operators and the twenty-one kinds (R29 to R49) of routings around the routing R39 which is the specific individual condition corresponding to the highest evaluation value group selected from the first simulation conditions) that forms the second refinement condition according to the refinement condition generation program that stores a portion (the round-robin combination of the routing candidates set by the set number of operators) of the predetermined calculation rule on the basis of the portion of the setting condition corresponding to the portion of the predetermined calculation rule and executes the simulation process and acquires the highest evaluation value group.

In the operational plan optimization device 1 and the operational plan optimization method according to the fourth embodiment, in the process of generating the refinement condition on the basis of the setting condition, the arithmetic control unit 401 that cooperates with the refinement condition generation program of the refinement control component 4 may combine the respective items of the setting condition input to the refinement control component 4 according to the round-robin competition and generate the refinement condition from the setting condition.

For example, when "the range of number of operators is 10, the candidates of routing in which a product flows along a work station of a production plant are one-hundred routings of R1, R2, R3, R4, R5, . . . , and R100 (the smaller the routing number, the higher the degree of similarity), and the like" are input to the first refinement control component 4 as the first setting condition, the arithmetic control unit 401 of the first refinement control component 4 generates the individual refinement condition groups NC1, NC2, . . . , and NCn (for example, other conditions which are added to each of the round-robin combinations of one kind (10) of number of operators and all routing candidates R1 to R100) that form the first refinement condition according to the refinement condition generation program that stores the predetermined calculation rule "setting the round-robin combination of the routing candidates set by the set number of operators" as the first refinement condition and executes the simulation process and acquires the highest evaluation value group.

Furthermore, when a specific individual condition among the first simulation conditions corresponding to the highest evaluation value group is "routing: R39" and "the range of number of operators is between 5 and 15, R39 is the routing candidate in which a product flows along a work station of a production plant, and the like" are input to the second refinement control component 4 as the second setting condition, the arithmetic control unit 401 of the second refinement control component 4 generates the individual refinement condition groups NC1', NC2', . . . , and NCn' (for example, other conditions which are added to each of the round-robin combinations of the eleven kinds (5 to 15) of number of operators and the routing candidate R39) that forms the second refinement condition according to the refinement condition generation program that stores the predetermined calculation rule (setting the round-robin combination of the routing candidates set by the set number of operators) as the second refinement condition and executes the simulation process and acquires the highest evaluation value group.

In the operational plan optimization device 1 and the operational plan optimization method according to the fourth embodiment, a calculation process based on a first setting condition and a first refinement condition and a calculation process based on a second setting condition and a second refinement condition may be performed, a calculation process based on a third setting condition and a third refinement condition may be performed, and a calculation process based on fourth and fifth setting conditions and fourth and fifth refinement conditions may be performed as necessary to search for an optimal operation.

This process is effective when a plurality of variables are narrowed down by a plurality of setting conditions and refinement conditions, for example, by narrowing two variables sequentially as first refinement and second refinement and searching a neighboring region using the two variables according to third refinement, and a neighboring region of an appropriate variable value is searched using a plurality of variables according to another setting condition and refinement condition to which the refinement result is applied.

For example, when "the range of number of operators is between 1 to 10, the production order in which a production plant produces ten types of products P1 to P10 is PS1, PS2, PS3, . . . , and PS362,880 (the factorial of 10, the smaller the production order number, the higher the degree of similarity), the round-robin combination of production orders set by the set number of operators is set (a portion of a predetermined calculation rule), and the like" are input to the first refinement control component 4 as the first setting condition, the arithmetic control unit 401 of the first refinement control component 4 generates the individual refinement condition groups NC1, NC2, . . . , and NCn (for example, other conditions which are added to each of the round-robin combinations (36, 288, and 800) of ten kinds (1 to 10) of number of operators and 362,880 kinds of production orders PS1, PS2, PS3, . . . , and PS362,880) that forms the first refinement condition according to the refinement condition generation program as the first refinement condition and executes a simulation process and acquires the highest evaluation value group.

Furthermore, when the specific individual condition among the first simulation conditions corresponding to the highest evaluation value group is "production order: PS67" and "the range of number of operators is between 5 and 15, the production order in which a production plant produces ten products P1 to P10 is PS67, a round-robin combination of the production orders set by the set number of operators is set (a portion of the predetermined calculation rule), and the like" are input to the second refinement control component 4 as the second setting condition, the arithmetic control unit 401 of the second refinement control component 4 generates the individual refinement condition groups NC1', NC2', . . . , and NCn' (for example, other conditions which are added to each of round-robin combinations of eleven kinds (5 to 15) of number of operators and the production order PS67) that forms the second refinement condition as the second refinement condition according to the refinement condition generation program and executes a simulation process and acquires the highest evaluation value group.

Furthermore, when the specific individual condition among the second simulation conditions corresponding to the highest evaluation value group is "the range of number of operators is 12 and the production order is PS67" and "the range of number of operators is between 10 and 14 (the two numbers around the number of operators 12), the production order at the center of production orders in which a production plant produces ten products P1 to P10 is PS67, ten production orders around the central production order are set (a portion of the setting conditions corresponding to a portion of the predetermined calculation rules), a round-robin combination of the production orders set by the set number of operators is set (a portion of the predetermined calculation rules), and the like" are input to the third refinement control component 4 as the second setting condition, the arithmetic control unit 401 of the third refinement control component 4 generates individual refinement condition groups NC1", NC2", . . . , and NCn" (for example, other conditions which are added to each of the round-robin combinations of five kinds (10 to 14) of number of operators and the production orders PS57 to PS77) that form the third refinement condition as the third refinement condition according to the refinement condition generation program and executes a simulation process and acquires the highest evaluation value group.

Like "the production orders PS1, PS2, PS3, . . . , and PS362,880 in which a production plant produces ten products P1 to P10" in the first setting condition, the simulation condition, the refinement condition, and the setting condition in the respective embodiments may preferably use individual conditions in which the production orders of a plurality of types of products produced by a production plant are replaced or individual conditions in which the orders of putting the respective products are replaced. In this way, it is possible to reliably attain optimal production and optimal operations for small-volume production in great varieties or production in great varieties.

In the operational plan optimization device 1 and the operational plan optimization method according to the fourth embodiment, a first parameter or a first parameter group (for example, the range of number of operators and a routing candidate in which a product flows along a work station of a production plant) within the refinement condition input from the first refinement control component 4 to the integrated control processing unit 2 can be different from a second parameter or a second parameter group (for example, a production order in which a production plant produces a plurality of products) within the refinement condition input from the second refinement control component 4 to the integrated control processing unit 2. In this case, a priority indicating whether the first parameter or parameter group or the second parameter or parameter group will be prioritized is stored in the data storage unit 222 of the integrated control processing unit 2. When the integrated control processing unit 2 recognizes the input of a refinement condition having the higher-priority parameter or parameter group before transmitting a simulation request corresponding to a refinement condition having the lower-priority parameter or parameter group, a process corresponding to the refinement condition having the lower-priority parameter or parameter group may be temporarily suspended or stopped, and a process corresponding to the refinement condition having the higher-priority parameter or parameter group may be started. The priority may be determined depending on the influence on productivity so that a parameter of high importance is prioritized.

According to the fourth embodiment, for example, when the first refinement condition is generated on the basis of the first setting condition of the first refinement control component 4, the result of the first highest evaluation value group obtained on the basis of the first refinement condition is the result for the range that depends on the first setting condition. In contrast, when an administrator determined that it is necessary to perform simulation under a different condition, it is possible to set a specific individual condition among the simulation conditions corresponding to the first highest evaluation value group as the second setting condition of the second refinement control component 4 and obtain the result of the second highest evaluation value group using the second refinement condition generated therefrom. Moreover, it is possible to execute processes according to the third and fourth refinement conditions continuously on the basis of the result. In this way, it is possible to attain a highest evaluation value group and an optimal operation which are considered to be optimal while continuously changing the refinement range without extending the range and strengthening the degree of refinement too much and eliminating the evaluation value group from an evaluation target. Even when a configuration in which one refinement control component 4 can selectively perform a process of generating the refinement condition according to the predetermined calculation rule for narrowing down the simulation range from the setting condition and a process of generating the refinement condition according to the predetermined calculation rule for extending the simulation range from the setting condition so that the refinement condition is generated according to the predetermined selected calculation rule is used, a similar effect is obtained (that is, it is possible to attain a highest evaluation value group and an optimal operation which are considered to be optimal while continuously changing the refinement range without extending the range and strengthening the degree of refinement too much and eliminating the evaluation value group from an evaluation target).

Since a plurality of refinement control components 4 that generates a refinement condition and is communicably connected to the integrated control processing unit 2 is provided, a first refinement control component 4 may be provided in a place where a production plan is created, a second refinement control component 4 may be provided in the site, the same or different persons may set the setting conditions to the first and second refinement control components 4, and the first and second refinement control components 2 may be caused to generate refinement conditions and execute operation simulation. In this way, it is possible to perform an operation simulation process flexibly according to the need in the process of creating an operational plan. Since a plurality of refinement control components 4 that generates a refinement condition on the basis of a setting condition is provided, it is possible to distribute a calculation processing amount for generating a refinement condition from a setting condition to the plurality of refinement control components 4 and to reduce the burden of a calculation process on the respective refinement control components 4. Furthermore, when a plurality of or a number of calculation processes based on such as the first, second, third, fourth, fifth setting conditions and refinement conditions are performed to search for an optimal operation and a process of acquiring an appropriate variable value of variable 1, an appropriate variable value of variable 2, and an appropriate variable value of variable 3, it is possible to perform the process of generating the refinement condition from the setting condition in parallel by the plurality of refinement control components 4 and to efficiently perform an overall process of attaining an optimal operation in short time.

Scope of Inventions Disclosed in Present Specification

The invention disclosed in the present specification includes each invention and each embodiment, and, within an applicable range, an invention specified by changing a partial configuration thereof to another configuration disclosed in the present specification, an invention specified by adding another configuration disclosed in the present specification to the configuration thereof, and an invention obtained by reducing, specifying and highly conceptualizing the partial configuration thereof as long as a partial effect is acquired. The invention disclosed in the present specification includes the following modified embodiments and postscripts.

For example, in the operational plan optimization device 1 of the above-described embodiment, although the integrated control processing unit 2 generates the simulation condition on the basis of the refinement condition of the refinement control component 4, the integrated control processing unit 2 may store the simulation condition in the data storage unit 222, transmit a simulation request based on the simulation condition to the simulator 3 to perform a simulation process. Furthermore, preferably, the integrated control processing unit 2 recognizes a basic simulation condition stored in the data storage unit 222, recognizes an operation state information group of a specific time point, generates a simulation condition to which a narrower conditional range is applied when a conditional range narrower than the individual condition of the basic simulation condition is present within the operation state information, and transmits a simulation request based on the simulation condition to the simulator 3 to perform a simulation process.

Figure 11:
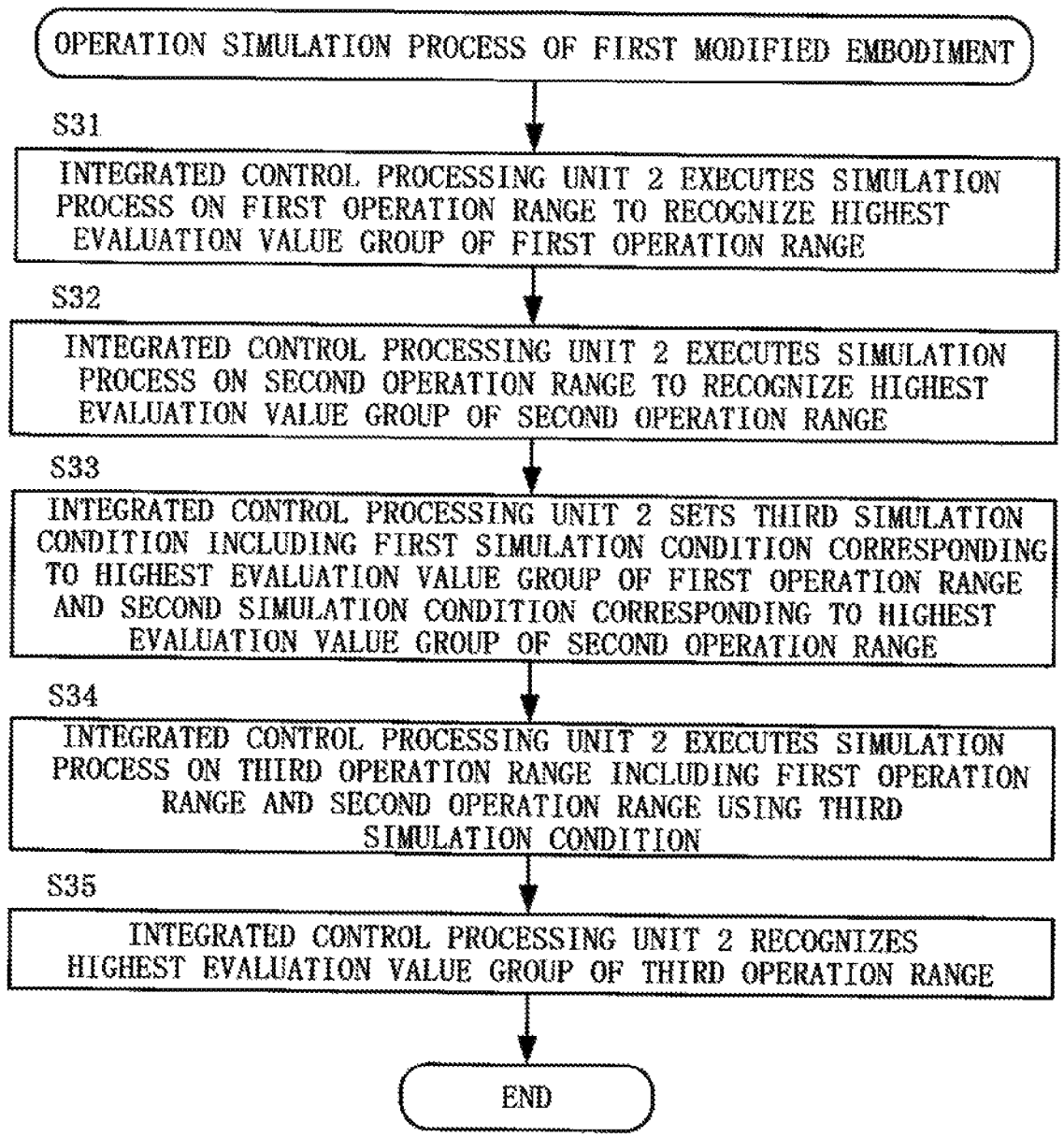
FIG. 11 is a flowchart illustrating an operation simulation process according to a first modified embodiment.

The operation simulation process or the operational plan optimization process performed using the operational plan optimization device 1 according to the first to fourth embodiment is not limited to those described above. For example, as illustrated in FIG. 11, the integrated control processing unit 2 may perform a process of executing a simulation process for a first operation range divided and recognized from an entire operation to recognize the highest evaluation value group of the first operation range by the processes similar to S1 to S10 (S31), executing a simulation process for a second operation range divided and recognized from an entire operation to recognize the highest evaluation value group of the second operation range by the processes similar to S1 to S10 (S32), setting a third simulation condition including a first simulation condition corresponding to the highest evaluation value group of the first operation range and a second simulation condition corresponding to the highest evaluation value group of the second operation range (S33), executing a simulation process for the third operation range including the first operation range and the second operation range using the third simulation condition (S34), and recognizing the highest evaluation value group of the third operation range (S35) (the process of a first modified embodiment). The third simulation condition for the third operation range may include a simulation condition corresponding to the highest evaluation value group of an operation range other than the first and second operation ranges.

In this process, for example, a production step $\alpha$ is set as a first operation range, a production step $\beta$ which is a subsequent step of the production step $\alpha$ is set as a second operation range, data necessary for the process related to the production steps $\alpha$ and $\beta$ is stored in the integrated control processing unit 2 and the simulator 3, and the integrated control processing unit 2 transmits a simulation request $\alpha Ri$ to the simulator 3 together with the simulation condition $\alpha SCi$ and the recognized operation state information groups $\alpha AS1$, $\alpha AS2$, . . . , and $\alpha ASn$ of the specific time point of the production step $\alpha$ to execute a simulation process and recognizes the highest evaluation value group of the production step α. Moreover, the integrated control processing unit 2 transmits a simulation request βRi to the simulator 3 together with the simulation condition βSCi and the recognized operation state information groups βBS1, βBS2, ..., and βBSn of the specific time point of the production step β to execute a simulation process and recognizes the highest evaluation value group of the production step β.

The integrated control processing unit 2 executes a process of setting a third simulation condition [αSCmax, βSCmax] using a simulation condition αSCmax corresponding to the highest evaluation value group of the production step α as a first simulation condition and a simulation condition βSCmax corresponding to the highest evaluation value group of the production step β as a second simulation condition, setting a production step (α+β) corresponding to a third operation range including the first operation range and the second operation range, transmitting a simulation request αβRi to the simulator 3 together with the operation state information groups αAS1, αAS2, ..., and αASn of the specific time point of the production step α, the operation state information groups βBS1, βBS2, ..., and βBSn of the specific time point of the production step β, and the third simulation condition [αSCmax, βSCmax] to execute a simulation process, and recognizing a highest evaluation value group of the entire production step (α+β).

According to the process of the first modified embodiment, when a calculation amount increases enormously and the number of combinations increases explosively if a simulation process of the entire operation is performed, it is possible to perform simulation in advance for a plurality of operation ranges divided from the entire operation to acquire a simulation condition for the entire operation from the result related to the partial optimization of the respective operation ranges, recognize the highest evaluation value group of the entire operation on the basis of the operation objective function according to the simulation condition, and recognize the highest evaluation value group and the optimal operation efficiently with a calculation amount which is practically executable with hardware resources. Moreover, since this method involves performing simulation based on the operation ranges divided from the entire operation, an operation which is easy to perform and which involves less change in an existing operation is likely to be recognized, and an optimal operation which is easily performed at the site and an operator. For example, combinations are calculated for a certain operation range of a production order on the basis of a present production plan to realize partial optimization and fitting, the combinations are processed sequentially for all operation ranges, and a simulation process is performed for the entire operation whereby the production plan can be changed to a production plan which is optimal on the extension line of the present plan.

Figure 12:
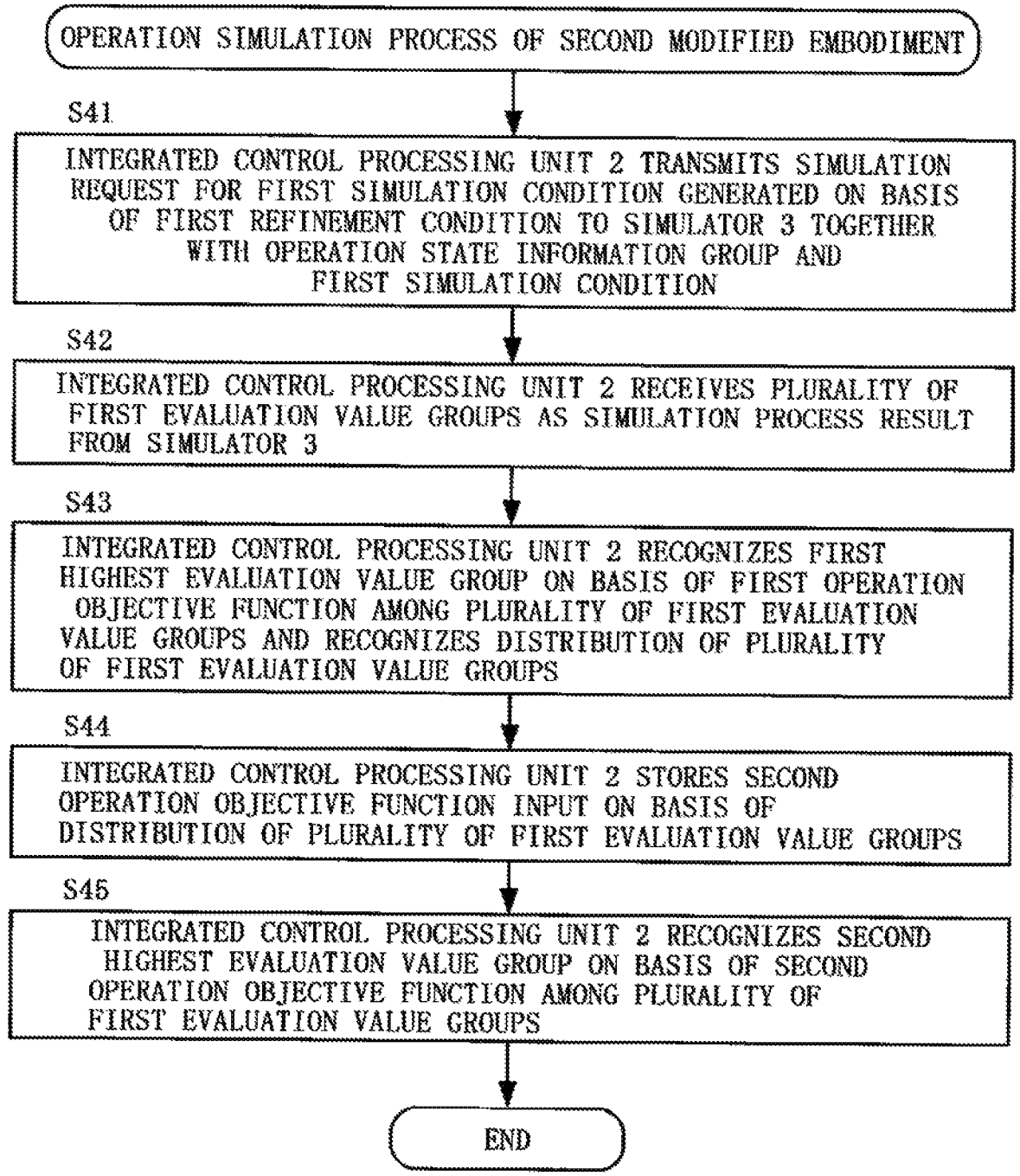
FIG. 12 is a flowchart illustrating an operation simulation process according to a second modified embodiment.

As another operation simulation process or another operational plan optimization process performed using the operational plan optimization device 1 according to the first to fourth embodiments, for example, as illustrated in FIG. 12, the integrated control processing unit 2 may perform a process of transmitting a simulation request of a necessary simulation condition corresponding to a first simulation condition generated on the basis of a necessary refinement condition corresponding to a first refinement condition to the respective simulators 3 together with the operation state information group and the first simulation condition (S41), receiving a plurality of first evaluation value groups as the simulation process result based on the first simulation condition and the operation state information group from the respective simulators 3 (S42), recognizing a first highest evaluation value group based on a predetermined operation objective function corresponding to a first operation objective function among the received plurality of first evaluation value groups and recognizing a distribution of the plurality of first evaluation value groups (S43), storing an input second operation objective function on the basis of the distribution of the plurality of first evaluation value groups (S44), and recognizing a second highest evaluation value group based on a second operation objective function among the plurality of first evaluation value groups (S45) (the process of a second modified embodiment).

In this process, for example, the integrated control processing unit 2 performs processes similar to S1 to S11 to recognize the first highest evaluation value group based on the first operation objective function among the received plurality of first evaluation value groups and recognize the distribution of the plurality of first evaluation value groups. In an example in which a weighted linear sum $S_i$ and a MAX function MAX($S_i$, i=1, 2, ..., t) of acquiring a largest value among the weighted linear sums $S_i$ are used as a first operation objective function, a user changes a necessary weighting factor among the weighting factors $w_j$ (j=1, 2, ..., n) on the basis of the distribution of the plurality of first evaluation value groups to input a second operation objective function to the integrated control processing unit 2, and the integrated control processing unit 2 stores the second operation objective function. After that, the integrated control processing unit 2 executes a process of recognizing the second highest evaluation value group based on the second operation objective function among the plurality of first evaluation value groups according to a predetermined input or the like and recognizing the distribution of the plurality of second evaluation value groups.

According to the process of the second modified embodiment, for example, when an administrator determines whether there is an appropriate solution or an optimal operation more than a solution or an optimal operation based on the first operation objective function, it is possible to set the second operation objective function by referring to the distribution of the plurality of first evaluation value groups, recognize a solution or an optimal operation based on the second operation objective function, and recognize a solution or an optimal operation based on each of a plurality of operation objective functions so that the administrator can compare and examine the solutions or the optimal operations. Therefore, it is possible to examine a plurality of evaluation value groups and a plurality of highest evaluation value groups in a comprehensive way and from various viewpoints to recognize a more optimal operation.

Figure 13:
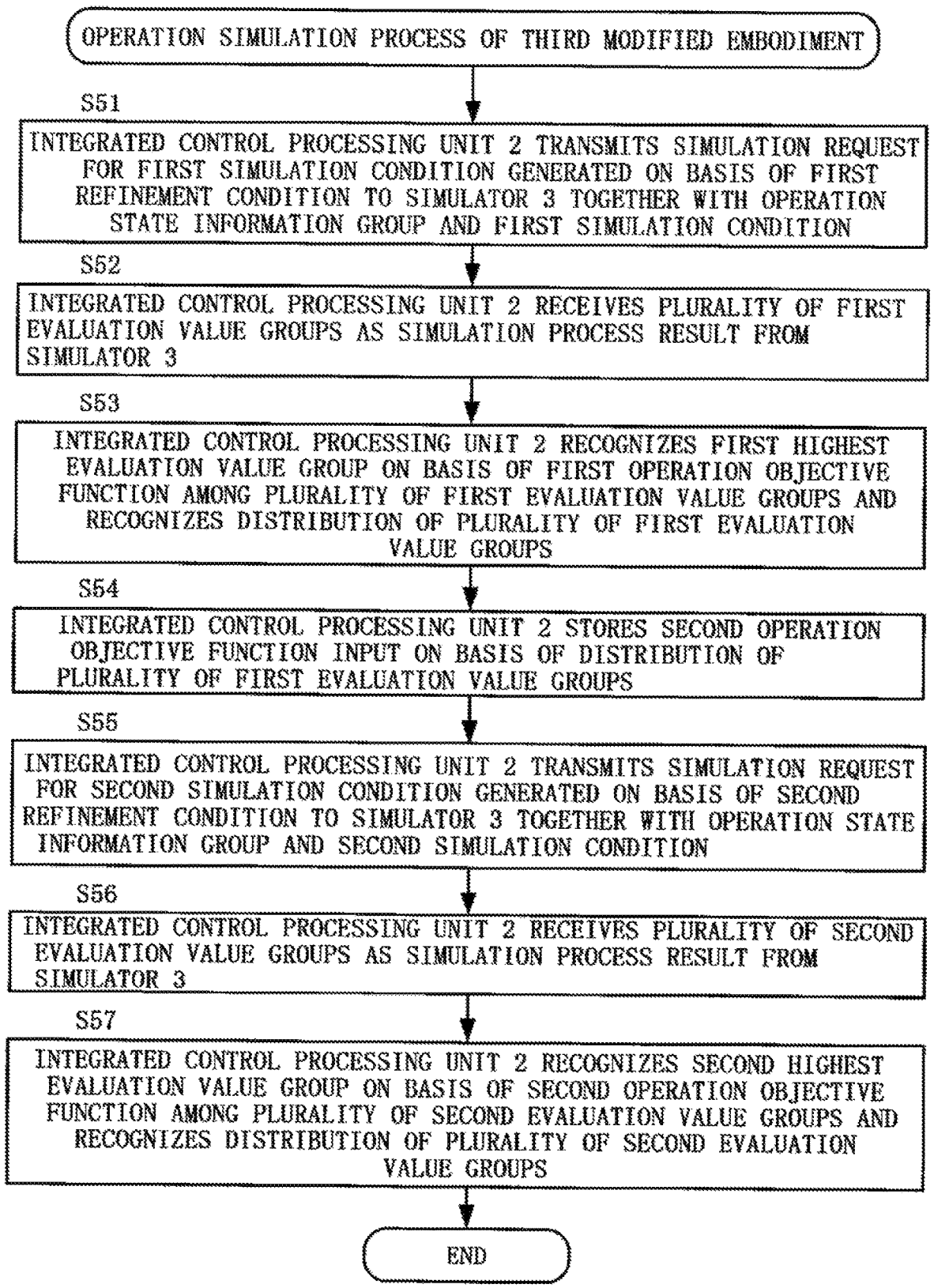
FIG. 13 is a flowchart illustrating an operation simulation process according to a third modified embodiment.

As another operation simulation process or another operational plan optimization process performed using the operational plan optimization device 1 according to the first to fourth embodiments, for example, as illustrated in FIG. 13, the integrated control processing unit 2 may perform a process of transmitting a simulation request of a first simulation condition generated on the basis of a first refinement condition to the respective simulators 3 together with the operation state information group and the first simulation condition (S51), receiving a plurality of first evaluation value groups as the simulation process result based on the first simulation condition and the operation state information group from the respective simulators 3 (S52), recognizing a first highest evaluation value group based on a first operation objective function among the received plurality of first evaluation value groups and recognizing a distribution of the plurality of first evaluation value groups (S53), storing an input second operation objective function on the basis of the distribution of the plurality of first evaluation value groups (S54), transmitting a simulation request of a second simulation condition generated on the basis of a second refinement condition to the respective simulators together with the operation state information group and a second simulation condition (S55), receiving a plurality of second evaluation value groups as the simulation process result based on the second simulation condition and the operation state information group from the respective simulators 3 (S56), recognizing a second highest evaluation value group based on a second operation objective function among the plurality of second evaluation value groups and recognizing the distribution of the plurality of second evaluation value groups (S57) (the process of a third modified embodiment).

In this process, for example, the integrated control processing unit 2 stores the second operation objective function by processes similar to S41 to S44 of the second modified embodiment, performs processes similar to S1 to S11 using the second refinement condition different from the first refinement condition, and executes a process of recognizing the second highest evaluation value group based on the second operation objective function among the received plurality of second evaluation value groups and recognizing the distribution of the plurality of second evaluation value groups.

According to the process of the third modified embodiment, it is possible to evaluate the plurality of first evaluation value groups of the simulation process result using the first operation objective function, recognize the first highest evaluation value group based on the first operation objective function, and recognize a second highest evaluation value group and the distribution of a plurality of second evaluation value groups different from the plurality of first evaluation value groups corresponding to the second refinement condition and the second simulation condition using a second operation objective function set by referring to the distribution of the plurality of first evaluation value groups. Therefore, for example, when an administrator determines whether there is an appropriate solution or an optimal operation more than a solution or an optimal operation based on the first refinement condition and the first operation objective function, it is possible to set the second operation objective function by referring to the distribution of the plurality of first evaluation value groups, recognize a solution or an optimal operation based on the second refinement condition and the second operation objective function, and recognize a solution or an optimal operation based on each of a plurality of refinement conditions and a plurality of operation objective functions so that the administrator can compare and examine the solutions or the optimal operations. Therefore, it is possible to examine a plurality of evaluation value groups and a plurality of highest evaluation value groups in a comprehensive way and from various viewpoints using the plurality of refinement conditions and the plurality of operation objective functions to recognize a more optimal operation.

Figure 14:
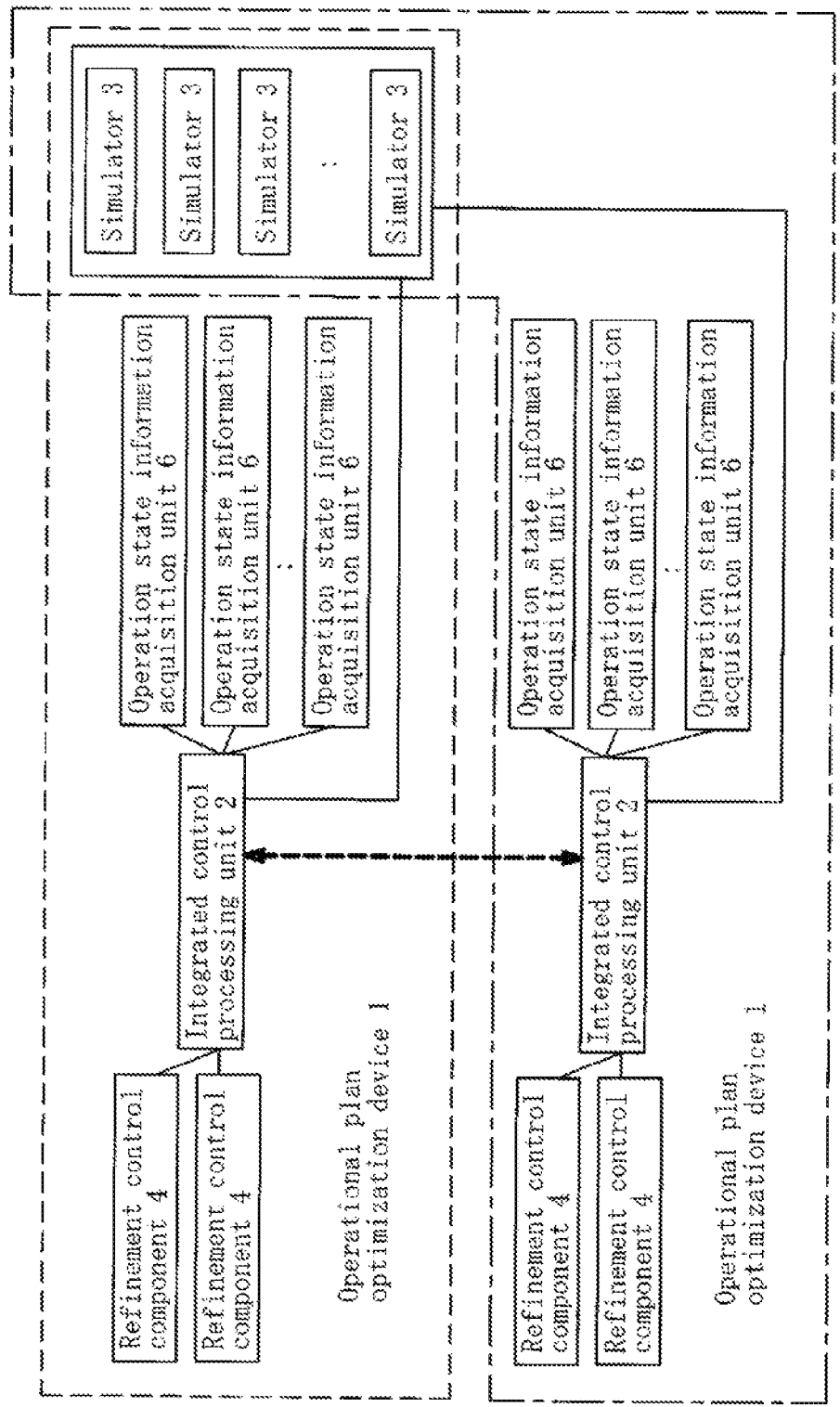
FIG. 14 is a block diagram illustrating a first example of a plurality of operational plan optimization devices that share a simulator group.
Figure 15:
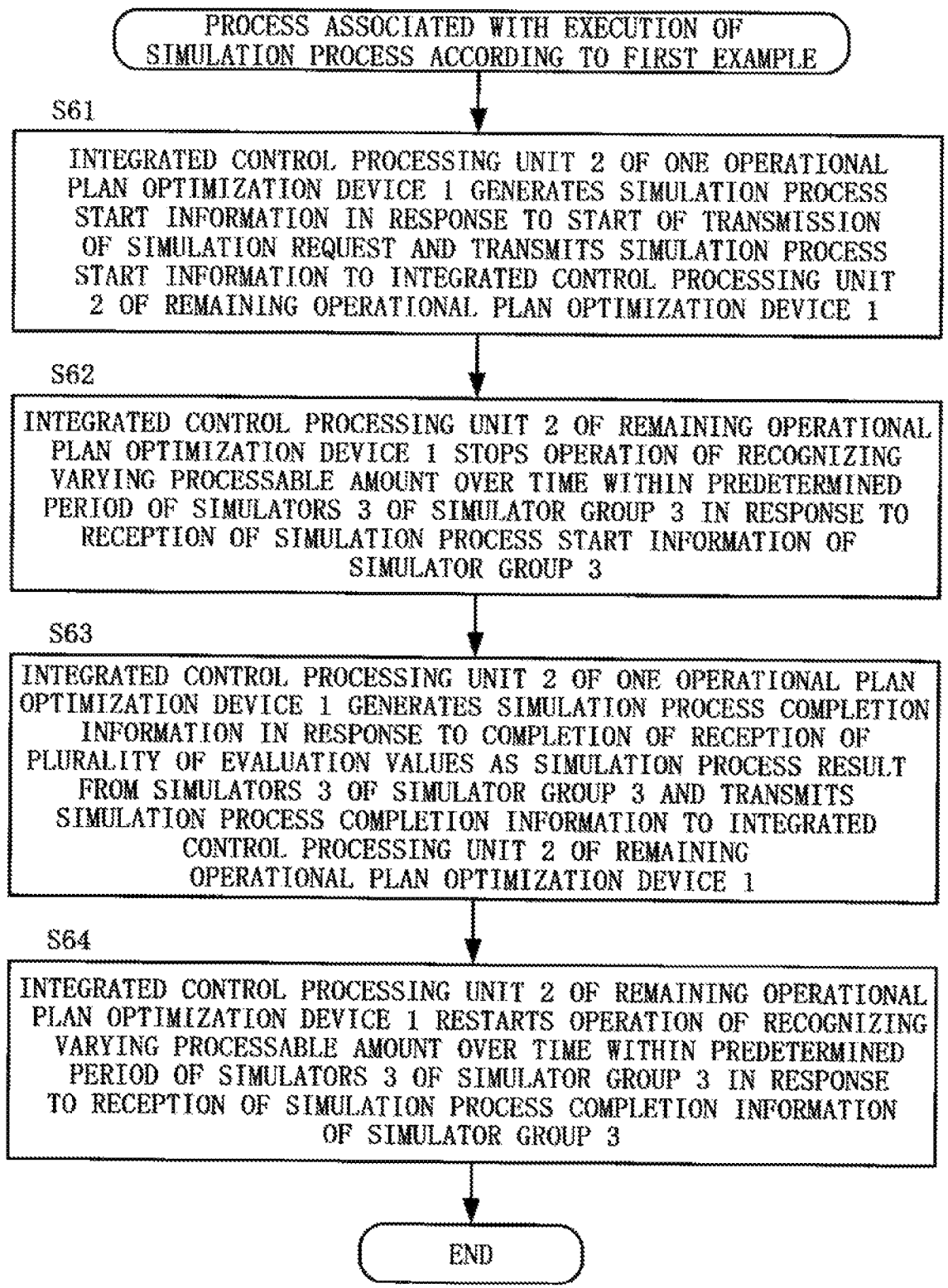
FIG. 15 is a flowchart illustrating a process associated with the use of a simulator group in the first example illustrated in FIG. 14.

As illustrated in FIGS. 14 and 15, in a system in which a plurality of operational plan optimization devices 1 including an integrated control processing unit 2 and a plurality of simulators 3 communicably connected to and controlled integrally by the integrated control processing unit 2, the plurality of operational plan optimization devices 1 share the simulator group 3 made up of the plurality of simulators 3, and the integrated control processing units 2 are communicably connected mutually, the integrated control processing unit 2 of one operational plan optimization device 1 may generate simulation process start information in response to the start of transmission of the simulation request to the simulator 3 and transmit the simulation process start information to the integrated control processing units 2 of the remaining operational plan optimization devices 1 (S61). The integrated control processing units 2 of the remaining operational plan optimization devices 1 may stop an operation of recognizing a varying processable amount over time within a predetermined period of the simulators 3 of the simulator group 3 in response to reception of the simulation process start information of the simulator group 3 (S62). The integrated control processing unit 2 of one operational plan optimization device 1 may generate simulation process completion information in response to completion of reception of a plurality of evaluation values as the simulation process result from the simulators 3 of the simulator group 3 and transmit the simulation process completion information to the integrated control processing units 2 of the remaining operational plan optimization devices 1 (S63). The integrated control processing units 2 of the remaining operational plan optimization devices 1 may restart the operation of recognizing the varying processable amount over time within a predetermined period of the simulators 3 of the simulator group 3 in response to reception of the simulation process completion information of the simulator group 3 (S64). Due to a configuration in which the integrated control processing units 2 of the plurality of operational plan optimization devices 1 directly switch between the start and the stopping of the simulation process, it is possible to perform a process of recognizing the processable amount over time of the simulator group 3 with less labor and efficiently use hardware resources by the plurality of operational plan optimization devices 1 sharing the simulator group 3.

Figure 16:
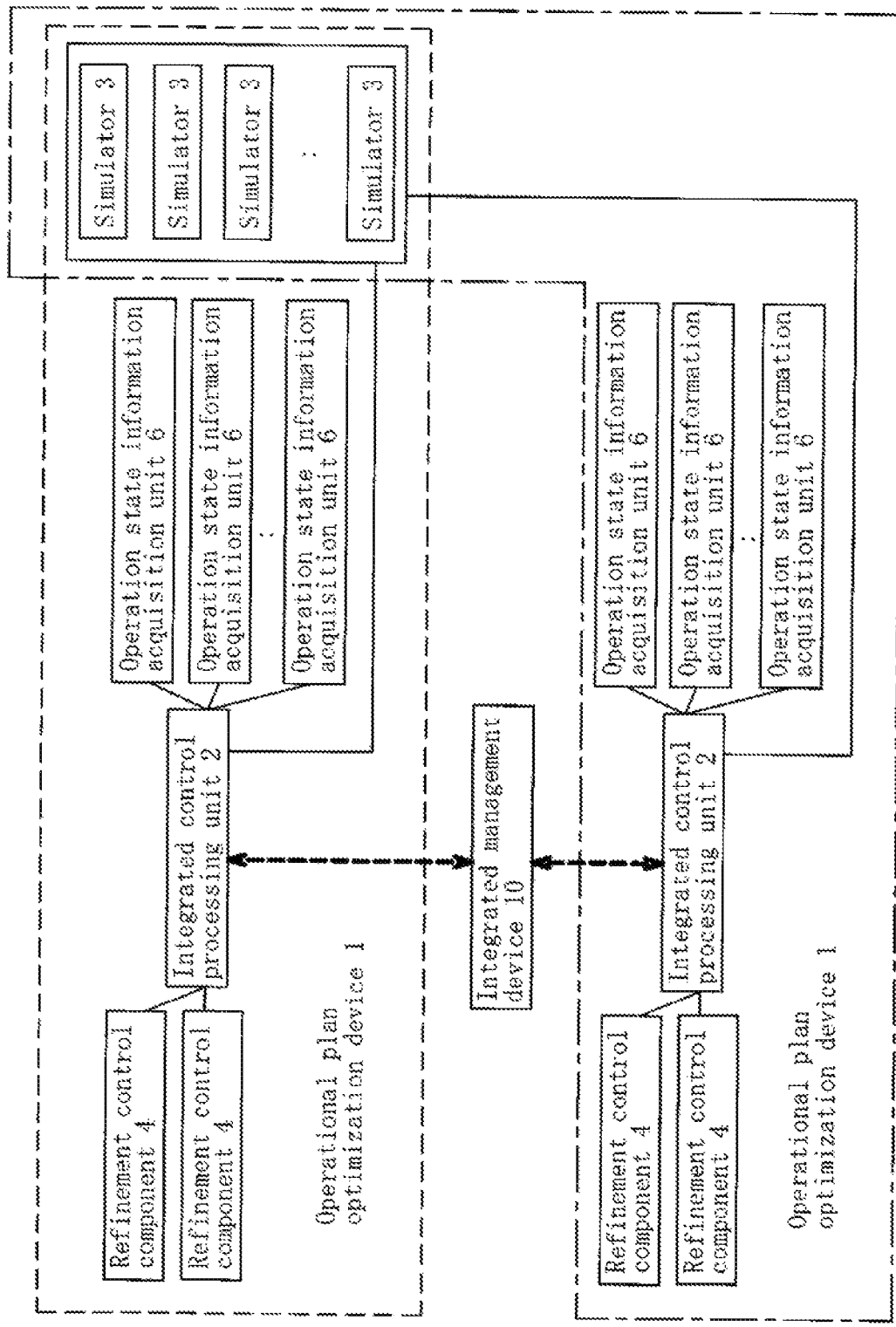
FIG. 16 is a block diagram illustrating a second example of a plurality of operational plan optimization devices that share a simulator group.
Figure 17:
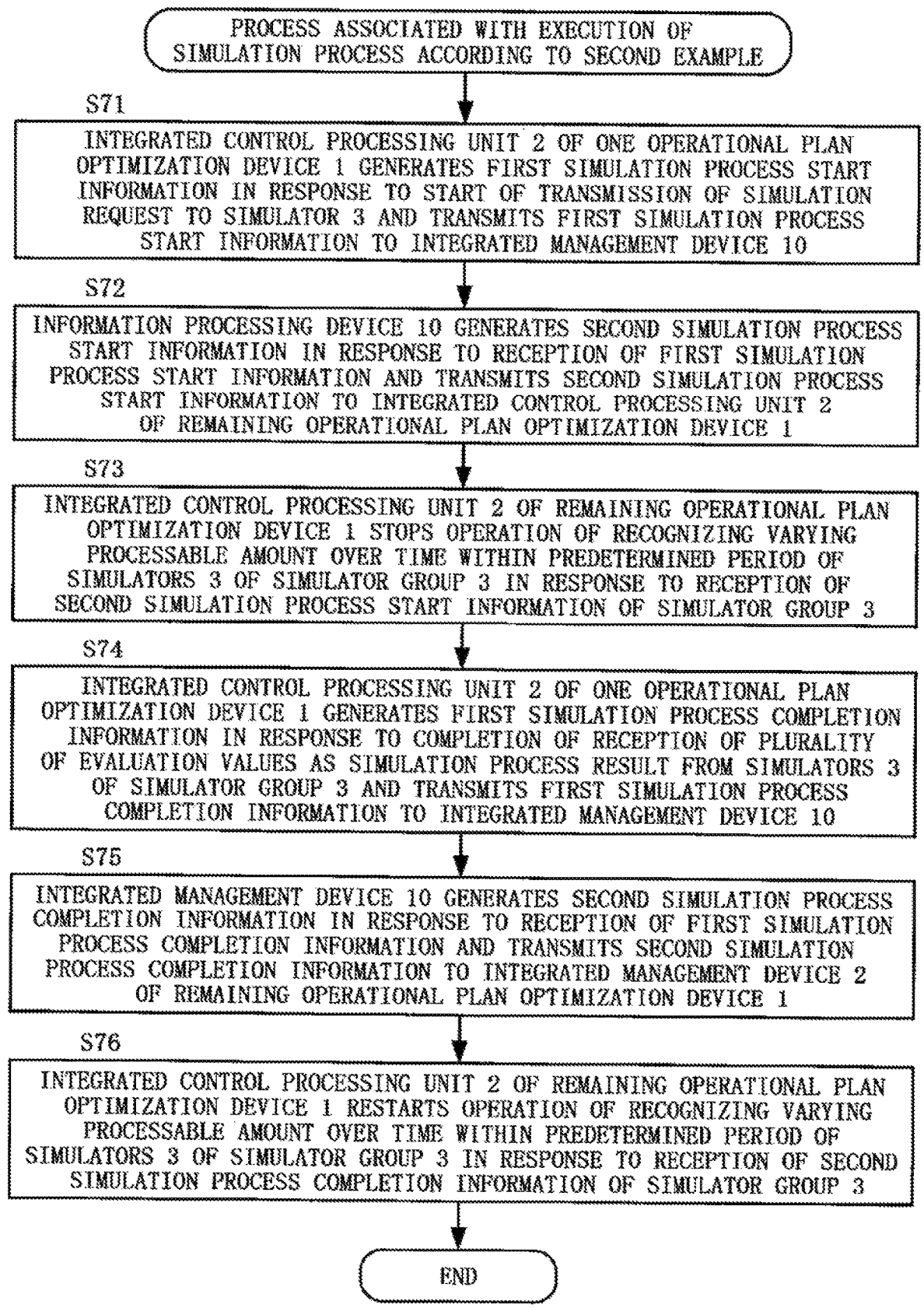
FIG. 17 is a flowchart illustrating a process associated with the use of a simulator group in the second example illustrated in FIG. 16.

As illustrated in FIGS. 16 and 17, in a system in which a plurality of operational plan optimization devices 1 including an integrated control processing unit 2 and a plurality of simulators 3 communicably connected to and controlled integrally by the integrated control processing unit 2, the plurality of operational plan optimization devices 1 share the simulator group 3 made up of the plurality of simulators 3, and the integrated control processing units 2 are communicably connected to the integrated management device 10 including an arithmetic control unit, a storage unit that stores a control program of the arithmetic control unit and data, an input unit, an output unit, and a communication interface. The integrated control processing unit 2 of one operational plan optimization device 1 may generate first simulation process start information in response to the start of transmission of the simulation request to the simulator 3 and transmit the first simulation process start information to the integrated management device 10 (S71). The integrated management device 10 or the arithmetic control unit thereof may generate second simulation process start information in response to reception of the first simulation process start information and transmit the second simulation process start information to the integrated control processing units 2 of the remaining operational plan optimization devices 1 (S72). The integrated control processing units 2 of the remaining operational plan optimization devices 1 may stop an operation of recognizing a varying processable amount over time within a predetermined period of the simulators 3 of the simulator group 3 in response to the second simulation process start information of the simulator group 3 (S73). The integrated control processing unit 2 of one operational plan optimization device 1 may generate first simulation process completion information in response to completion of reception of a plurality of evaluation values as the simulation process result from the simulators 3 of the simulator group 3 and transmit the first simulation process completion information to the integrated management device 10 (S74). The integrated management device 10 or the arithmetic control unit thereof may generate second simulation process completion information in response to reception of the first simulation process completion information and transmit the second simulation process completion information to the integrated control processing units 2 of the remaining operational plan optimization devices 1 (S75). The integrated control processing units 2 of the remaining operational plan optimization devices 1 may restart an operation of recognizing a varying processable amount over time within a predetermined period of the simulators 3 of the simulator group 3 in response to reception of the second simulation process completion information of the simulator group 3 (S76). Due to a configuration in which the integrated control processing units 2 of the plurality of operational plan optimization devices 1 indirectly switch between the start and the stopping of the simulation process, it is possible to perform a process of recognizing the processable amount over time of the simulator group 3 with less labor and efficiently use hardware resources by the plurality of operational plan optimization devices 1 sharing the simulator group 3.

INDUSTRIAL APPLICABILITY

The present invention can be used when performing discrete simulation of various operations such as, for example, a production step, a logistics step, plant layout planning, and manpower planning to obtain effect analysis results.

REFERENCE SIGNS LIST

1: Operational plan optimization device
2: Integrated control processing unit
21: Arithmetic control unit
22: Storage unit
221: Processing program storage unit
222: Data storage unit
23: Input unit
24: Output unit
25: Communication interface
3: Simulator
31: Arithmetic control unit
32: Storage unit
321: Processing program storage unit
322: Data storage unit
33: Input unit
34: Output unit
35: Communication interface
4: Refinement control component
41: Refinement condition storage unit
401: Arithmetic control unit
402: Storage unit
42: Program storage unit
403: Input unit
404: Output unit
405: Communication interface
5: Operator terminal
51: Arithmetic control unit
52: Storage unit
521: Processing program storage unit
522: Data storage unit
53: Input unit
54: Output unit
55: Communication interface
6: Operation state information acquisition unit
10: Integrated management device

The invention claimed is:

1. An operational plan optimization device comprising:
an integrated control processing unit; and
a plurality of simulators communicably connected to and controlled integrally by the integrated control processing unit,
wherein the integrated control processing unit is configured to:
recognize a varying processable amount over time within a predetermined period of each of the simulators, the varying processable amount relating to at least one of a central processing unit (CPU) performance, a CPU operating rate, a memory capacity, and a memory operating rate of each of the simulators;
transmit a simulation request for a simulation process within an optimal processing amount within the recognized processable amount of each of the simulators to each of the simulators for parallel execution by at least two of the simulators, together with an operation state information group and a simulation condition;
receive a plurality of evaluation value groups as a simulation process result based on the operation state information group and the simulation condition from each of the simulators;
determine an operation objective evaluation value for each of the plurality of evaluation value groups based on an operation objective function; and
recognize a highest evaluation value group having a largest operation objective evaluation value among the plurality of evaluation value groups,
wherein the integrated control processing unit receives information on the start and completion of the simulation process directly or indirectly from another integrated control processing unit of another operational plan optimization device that shares the plurality of simulators, and
wherein the integrated control processing unit stops recognizing the varying processable amount over time within the predetermined period of each of the simulators from the start to the completion of the simulation process.

2. The operational plan optimization device according to claim 1, wherein
the evaluation value group includes a degree of similarity to a present operation as an evaluation value.

3. An operational plan optimization method which uses the operational plan optimization device according to claim 2,
wherein the simulation process is divided into a first operation range for a first subset of production steps in the simulation process and a second operation range for a second subset of the production steps in the simulation process different from the first subset of production steps, and
wherein the transmitting of the simulation request transmits a first simulation request for simulation on the first operation range to one of the simulators with the operation state information group and the simulation condition associated with the first subset of the production steps, and transmits a second simulation request for simulation on the second operation range to another one of the simulators with the operation state information group and the simulation condition associated with the second subset of the production steps, wherein the receiving receives a first plurality of evaluation value groups as the simulation process result from the one of the simulators and a second plurality of evaluation value groups as the simulation process result from the another one of the simulators, wherein the determining determines the operation objective evaluation value for each of the first plurality of evaluation value groups for the first operating range based on the operation objective function and determines the operation objective evaluation value for each of the second plurality of evaluation value groups for the second operating range based on the operation objective function, wherein the recognizing recognizes the highest evaluation value group having the largest operation objective evaluation value among the first plurality of evaluation value groups for the first operating range and the highest evaluation value group having the largest operation objective evaluation value among the second plurality of evaluation value groups for the second operating range, and wherein the integrated control processing unit is further configured to:

set another simulation condition including a first simulation condition corresponding to the highest evaluation value group for the first operation range and a second simulation condition corresponding to the highest evaluation value group for the second operation range;

transmit another simulation request for simulation on a third operation range including the first operation range and the second operation range to at least one of the simulators with the operation state information group associated with the first subset of the production steps, the operation state information group associated with the second subset of the production steps, and the another simulation condition;

receive a third plurality of evaluation value groups as the simulation process result from the at least one of the simulators;

determine the operation objective evaluation value for each of the third plurality of evaluation value groups for the third operation range based on the operation objective function; and recognize the highest evaluation value group having the largest operation objective evaluation value among the third plurality of evaluation value groups for the third operation range.

4. The operational plan optimization device according to claim 1, further comprising:

an operation state information acquisition unit that acquires the operation state information, wherein the operation state information is transmitted from the operation state information acquisition unit to the integrated control processing unit.

5. The operational plan optimization device according to claim 4, wherein the integrated control processing unit generates an individual operation instruction corresponding to the recognized highest evaluation value group and transmits the individual operation instruction to at least an operator terminal approximately on a real-time basis.

6. The operational plan optimization device according to claim 1, wherein the integrated control processing unit generates an individual operation instruction corresponding to the recognized highest evaluation value group and transmits the individual operation instruction to at least an operator terminal approximately on a real-time basis.

7. The operational plan optimization device according to claim 1, further comprising:

a refinement control component communicably connected to the integrated control processing unit, wherein the integrated control processing unit generates a simulation condition on the basis of the operation state information group and a refinement condition of the refinement control component.

8. The operational plan optimization device according to claim 7, wherein a degree of refinement of the refinement condition of the refinement control component is changeable, or the refinement conditions of a plurality of degrees of refinement are set in the refinement control component.

9. The operational plan optimization device according to claim 8, wherein the refinement control component generates the refinement condition on the basis of a setting condition and a plurality of refinement control components are provided.

10. The operational plan optimization device according to claim 7, wherein the refinement control component generates the refinement condition on the basis of a setting condition and a plurality of refinement control components are provided.

11. An operational plan optimization method which uses the operational plan optimization device according to claim 7, wherein the simulation process is divided into a first operation range for a first subset of production steps in the simulation process and a second operation range for a second subset of the production steps in the simulation process different from the first subset of production steps, and wherein the transmitting of the simulation request transmits a first simulation request for simulation on the first operation range to one of the simulators with the operation state information group and the simulation condition associated with the first subset of the production steps, and transmits a second simulation request for simulation on the second operation range to another one of the simulators with the operation state information group and the simulation condition associated with the second subset of the production steps, wherein the receiving receives a first plurality of evaluation value groups as the simulation process result from the one of the simulators and a second plurality of evaluation value groups as the simulation process result from the another one of the simulators, wherein the determining determines the operation objective evaluation value for each of the first plurality of evaluation value groups for the first operating range based on the operation objective function and determines the operation objective evaluation value for each of the second plurality of evaluation value groups for the second operating range based on the operation objective function, wherein the recognizing recognizes the highest evaluation value group having the largest operation objective evaluation value among the first plurality of evaluation value groups for the first operating range and the highest evaluation value group having the largest operation objective evaluation value among the second plurality of evaluation value groups for the second operating range, and wherein the integrated control processing unit is further configured to:

set another simulation condition including a first simulation condition corresponding to the highest evaluation value group for the first operation range and a second simulation condition corresponding to the highest evaluation value group for the second operation range;

transmit another simulation request for simulation on a third operation range including the first operation range and the second operation range to at least one of the simulators with the operation state information group associated with the first subset of the production steps, the operation state information group associated with the second subset of the production steps, and the another simulation condition;

receive a third plurality of evaluation value groups as the simulation process result from the at least one of the simulators;

determine the operation objective evaluation value for each of the third plurality of evaluation value groups for the third operation range based on the operation objective function; and recognize the highest evaluation value group having the largest operation objective evaluation value among the third plurality of evaluation value groups for the third operation range.

12. An operational plan optimization method which uses the operational plan optimization device according to claim 1, wherein the simulation process is divided into a first operation range for a first subset of production steps in the simulation process and a second operation range for a second subset of the production steps in the simulation process different from the first subset of production steps, and wherein the transmitting of the simulation request transmits a first simulation request for simulation on the first operation range to one of the simulators with the operation state information group and the simulation condition associated with the first subset of the production steps, and transmits a second simulation request for simulation on the second operation range to another one of the simulators with the operation state information group and the simulation condition associated with the second subset of the production steps, wherein the receiving receives a first plurality of evaluation value groups as the simulation process result from the one of the simulators and a second plurality of evaluation value groups as the simulation process result from the another one of the simulators, wherein the determining determines the operation objective evaluation value for each of the first plurality of evaluation value groups for the first operating range based on the operation objective function and determines the operation objective evaluation value for each of the second plurality of evaluation value groups for the second operating range based on the operation objective function, wherein the recognizing recognizes the highest evaluation value group having the largest operation objective evaluation value among the first plurality of evaluation value groups for the first operating range and the highest evaluation value group having the largest operation objective evaluation value among the second plurality of evaluation value groups for the second operating range, and wherein the integrated control processing unit is further configured to:

set another simulation condition including a first simulation condition corresponding to the highest evaluation value group for the first operation range and a second simulation condition corresponding to the highest evaluation value group for the second operation range;

transmit another simulation request for simulation on a third operation range including the first operation range and the second operation range to at least one of the simulators with the operation state information group associated with the first subset of the production steps, the operation state information group associated with the second subset of the production steps, and the another simulation condition;

receive a third plurality of evaluation value groups as the simulation process result from the at least one of the simulators;

determine the operation objective evaluation value for each of the third plurality of evaluation value groups for the third operation range based on the operation objective function; and recognize the highest evaluation value group having the largest operation objective evaluation value among the third plurality of evaluation value groups for the third operation range.

\* \* \* \* \*